(12) United States Patent
Sapozhnikov et al.

(10) Patent No.: US 10,140,206 B2
(45) Date of Patent: Nov. 27, 2018

(54) COMPUTERIZED METHOD AND END-TO-END "PILOT AS A SERVICE" SYSTEM FOR CONTROLLING START-UP/ENTERPRISE INTERACTIONS

(71) Applicant: PROOV SYSTEMS LTD., Herzliya (IL)

(72) Inventors: Alexey Sapozhnikov, Ramat Gan (IL); Toby Olshanetsky, Herzliya (IL)

(73) Assignee: PROOV SYSTEMS LTD., Herzliya (IL)

( * ) Notice: Subject to any disclaimer, the term of this patent is extended or adjusted under 35 U.S.C. 154(b) by 57 days.

(21) Appl. No.: 15/347,191

(22) Filed: Nov. 9, 2016

(65) Prior Publication Data
US 2017/0139816 A1     May 18, 2017

Related U.S. Application Data

(60) Provisional application No. 62/376,720, filed on Aug. 18, 2016, provisional application No. 62/256,213, filed on Nov. 17, 2015.

(51) Int. Cl.
*G06F 11/36*     (2006.01)
*G06F 8/00*     (2018.01)
(Continued)

(52) U.S. Cl.
CPC ............ *G06F 11/3672* (2013.01); *G06F 8/00* (2013.01); *G06F 8/60* (2013.01); *G06F 11/3457* (2013.01);
(Continued)

(58) Field of Classification Search
None
See application file for complete search history.

(56) References Cited

U.S. PATENT DOCUMENTS

| | | |
|---|---|---|
| 5,644,694 A | 7/1997 | Appleton |
| 5,729,669 A | 3/1998 | Appleton |
| (Continued) | | |

FOREIGN PATENT DOCUMENTS

WO     2008/134453     11/2008

OTHER PUBLICATIONS

Application Layer Intrustion Detection, Sep. 7, 2015, pp. 1-2.
(Continued)

*Primary Examiner* — Lewis A Bullock, Jr.
*Assistant Examiner* — Mark A Gooray
(74) *Attorney, Agent, or Firm* — Browdy and Neimark, P.L.L.C.

(57) ABSTRACT

An end-to-end "pilot as service" system for software pilot testing, comprising a server including at least one processor and operative for generating a set of software testing environment/s simultaneously serving plural clients from among a first plurality of enterprise clients, the environment being operative for concurrently running plural proof-of-concept tests for respective plural software products each being tested ("pilots"), on behalf of an individual start-up client from among a second plurality of start-up clients, by an individual one of the population of enterprise clients; a registration functionality, on the processor, operative for pre-registering at least one of: enterprise clients from among the first plurality of enterprise clients, and start-up clients from among the second plurality of start-up clients; and a dashboard functionality, on the processor, operative for presenting at least one result of at least one proof-of-concept test to each client which has pre-registered using said registration functionality.

41 Claims, 9 Drawing Sheets

(51) Int. Cl.
*G06F 8/60* (2018.01)
*G06F 11/34* (2006.01)
*G06F 17/30* (2006.01)

(52) U.S. Cl.
CPC ...... *G06F 11/3664* (2013.01); *G06F 11/3668* (2013.01); *G06F 17/30* (2013.01)

(56) References Cited

U.S. PATENT DOCUMENTS

| | | | |
|---|---|---|---|
| 7,509,626 B1* | 3/2009 | Barnes | G06F 11/3672 |
| | | | 705/7.41 |
| 7,620,933 B1 | 11/2009 | Appleton | |
| 8,694,953 B2 | 4/2014 | Khodabandehloo et al. | |
| 9,329,915 B1 | 5/2016 | Chandrasekharapuram et al. | |
| 2004/0111428 A1 | 6/2004 | Rajan et al. | |
| 2008/0134281 A1* | 6/2008 | Shinde | G06F 21/31 |
| | | | 726/1 |
| 2012/0266135 A1* | 10/2012 | Mansour | G06F 11/3648 |
| | | | 717/124 |
| 2014/0365198 A1 | 12/2014 | Kuell et al. | |
| 2017/0139816 A1 | 5/2017 | Sapozhnikov et al. | |

OTHER PUBLICATIONS

Apache Commons Math, Oct. 29, 2015, p. 1-21.
Apache Drill, Oct. 23, 2015, pp. 1-2.
H2oai/sparkling-water, Aug. 10, 2015, pp. 1-4.
Apache Flink, Oct. 15, 2015, pp. 1-3.
Map Reduce, Oct. 25, 2015, pp. 1-6.

* cited by examiner

Fig. 3 - example query

```
DataSet<Tuple2<String, Integer>> PilotXKPI_Transaction_Time =
    text.flatMap(new ScalaBillItLineSplitter())
    .groupBy(0)
    .aggregate(Aggregations.SUM, 1);
```

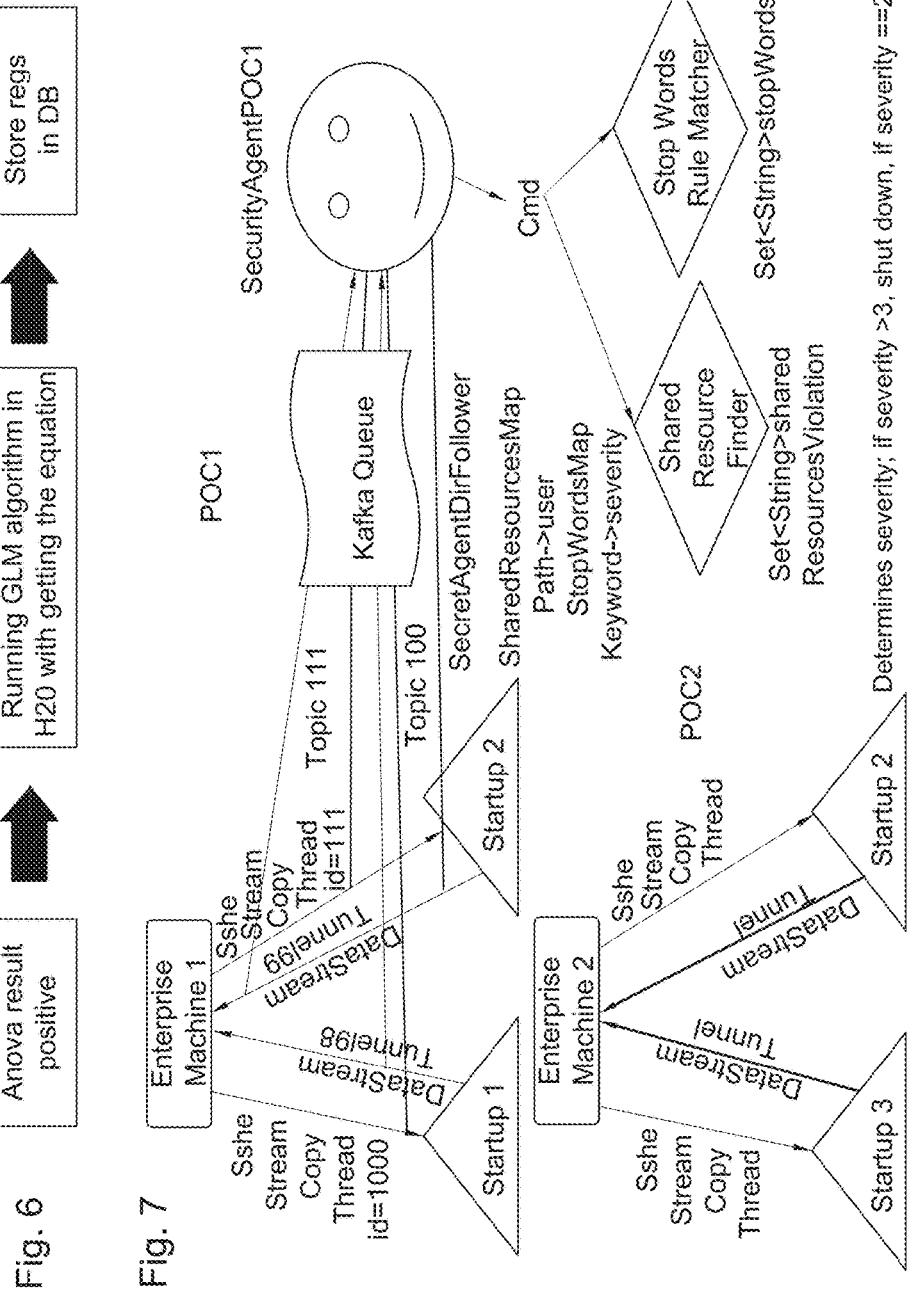

COMPUTERIZED METHOD AND END-TO-END "PILOT AS A SERVICE" SYSTEM FOR CONTROLLING START-UP/ENTERPRISE INTERACTIONS

REFERENCE TO CO-PENDING APPLICATIONS

Priority is claimed from U.S. provisional application No. 62/256,213, entitled "Computerized System And Method For Controlling Start-Up/Enterprise Interactions" and filed Nov. 17, 2015, and U.S. Provisional Patent Application No. 62/376,720 entitled "Computerized System For Facilitating Management of Proof-Of-Concept Software Pilots, Which May be Based on Neural Networks" and filed Aug. 18, 2016, the disclosures of which are hereby incorporated by reference.

FIELD OF THIS DISCLOSURE

The present invention relates generally to computerized systems and more particularly to use of computerized systems to perform pilots.

BACKGROUND FOR THIS DISCLOSURE

Quali.com provides a "Cloud Sandbox for Development and Test Labs" which is said to "transform Dev and Test Labs into global, on-demand, lab-as-a-service clouds to maximize cost efficiencies, achieve faster releases, and ensure higher quality".

Iterate.ai is a "self-service Innovation Platform" with access to plural Startups (which) which includes AI-based search, and "monitors" IoT, Deep Learning, App-less Mobility solutions and Virtual POS.

OpenLegacy.com allows integrating back-end systems of record through APIs to various systems of engagement such as mobile or web, striving to deliver secure managed cloud services without re-hosting or changing current applications or platforms.

Applaud.com provides functional testing services. End users may upload or direct to their website or app, indicate the type of testing and testing scope they seek, and obtain testing results for websites, apps, and connected devices. An end-user can receive and review issues in real time.

Wikipedia describes that Apache Flink is a community-driven framework for distributed big data analytics, like Hadoop and Spark. The core of Apache Flink is a distributed streaming dataflow engine written in Java and Scala Flink aims to bridge the gap between mapreduce-like systems and shared-nothing parallel database systems by executing arbitrary dataflow programs in a data-parallel and pipelined manner Flink's pipelined runtime system enables execution of bulk/batch and stream processing programs.

Wikipedia describes that mapreduce is a framework for processing parallelizable problems across large datasets using a large number of computers (nodes), collectively referred to as a cluster (if all nodes are on the same local network and use similar hardware) or as a grid (if the nodes are shared across geographically and administratively distributed systems, and use more heterogenous hardware). Processing can occur on data stored either in a filesystem (unstructured) or in a database (structured). Mapreduce can take advantage of data locality by processing data near where the data is stored to reduce the distance over which data is transmitted. In mapreduce, in an initial "Map" operation, each worker node applies the "map( )" function to the local data, and writes the output to a temporary storage. A master node ensures that only one copy of redundant input data is processed. In an interim "Shuffle" operation, Worker nodes redistribute data based on the output keys (produced by the "map( )" function), such that all data belonging to one key is located on the same worker node. In a final "Reduce" operation, worker nodes process each group of output data, per key, in parallel.

Wikipedia describes that mapreduce supports distributed processing of map and reduction operations. If each mapping operation is independent of others, all maps can be performed in parallel, limited by the number of independent data sources and/or number of CPUs near each source. Also, a set of 'reducers' can perform reduction, provided all outputs of the map operation that share the same key are presented to the same reducer at the same time, or providing that the reduction function is associative. Mapreduce can be applied to significantly larger datasets than "commodity" servers can handle; a large server farm using mapreduce can sort a petabyte of data in only a few hours. The parallelism is also advantageous because if one mapper or reducer fails, the work can be rescheduled if the input data is still available.

Wikipedia describes that mapreduce may include a 5-stage parallel and distributed computation which may run in sequence or the stages may be interleaved:

1. Prepare the Map( ) input—the "mapreduce system" designates Map processors, assigns the input key value K1 that each processor would work on, and provides that processor with all the input data associated with that key value.
2. Run the user-provided Map( ) code—Map( ) is run exactly once for each K1 key value, generating output organized by key values K2.
3. "Shuffle" the Map output to the Reduce processors—the mapreduce system designates Reduce processors, assigns the K2 key value each processor may work on, and provides that processor with all the Map-generated data associated with that key value.
4. Run the user-provided Reduce( ) code—Reduce( ) is run exactly once for each K2 key value produced by the Map stage.
5. Produce the final output—the mapreduce system collects all the Reduce output, and sorts it by K2 to produce the final outcome.

The disclosures of all publications and patent documents mentioned in the specification, and of the publications and patent documents cited therein directly or indirectly, are hereby incorporated by reference.

SUMMARY OF CERTAIN EMBODIMENTS

Certain embodiments of the present invention seek to provide at least one processor in communication with at least one memory, with instructions stored in such memory executed by the processor to provide functionalities which are described herein in detail.

Certain embodiments seek to provide an end-to-end "pilot as a service" system (analogous to "software as a service" [SaaS] systems) including a platform for controlling start-up/enterprise interactions. Typically, the platform's server functions as a proxy or man-in-the-middle monitoring a secured access channel e.g. proxy channel, providing network connection between each of plural pilots and a software testing environment/SaaS service associated with that pilot. The server typically uses data flow over said channel to compute KPIs characterizing a proof-of-concept test e.g. pilot, from among said plural proof-of-concept tests, associated with that channel.

Certain embodiments seek to provide an end-to-end pilot as service system in which pilot software testing can be performed for plural pilots simultaneously, wherein each pilot, once registered with the system, is associated by the system with an access channel and the system server functions as a proxy or "man in the middle", collecting, from each access channel, data characterizing the pilot associated with that access channel. It is appreciated that the applicability of the system is not limited to any particular service since new services may be supported by, or integrated into, the system, particularly if the new service uses a network protocol, such as TCP/IP or file transfer protocol, used by already-supported services. Each access channel typically provides a network connection between the pilot associated therewith, and a software environment assigned to that pilot, thereby to grant to each pilot, once registered, access to an automated test environment. One test environment may, for example, be on the platform's cloud whereas another test environment may be on an enterprise server's cloud. Optionally, as part of an enterprise registration process, an enterprise may define its environments, where various types of environment are supported including those on the platform's cloud and those on an enterprise server's cloud. Therefore, the access channel may for example be to an API or database or big data subsystem or Docker subsystem.

To integrate new services into the system, a programmer may simply discover the input/output TCP/IP protocol of service; and implement a new Access Channel as a proxy of input/output as discovered. The system shown and described herein is typically configured to adopt such a new Access Channel automatically. The programmer may define a set of measured KPIs for the new service and may implement those KPIs as a KPIAble interface for deployment in the system shown and described herein.

Running a software pilot between a startup and an enterprise (or even between two mature ISVs) is a long and painful task, taking up scarce IT/CTO resources. Technical start-ups e.g. developing software products face many challenges. For example, their technology needs to be tested, using what is called a "pilot", e.g. prior to their acquisition by a customer or enterprise. It is very challenging for enterprises to provide access for pilots due to security issues, lack of time, and cost of resources (time of IT/R&D manpower). Enterprises often cannot validate the effectiveness of more than one start-up at a time. At most, they can only manage a few pilots at a time. Consequently enterprises miss out on new technology and tech start-ups e.g. B2B/B2B2C startups, lack easy access to pilots. Many other difficulties plague both enterprises and startups.

A platform is provided, facilitating interactions between startups and organizations open for a pilot on topics of mutual interest. Piloting organizations or enterprises register, including exposing their POC (proof of concept) environment to the server associated with the platform. A startup may "acquire" a pilot by mutual consent expressed via the platform. For example, one of the two sides may respond positively to a "join pilot" request issued by the other side e.g. by clicking on a "join" button associated with a specific pilot in a user interface generated by the platform for each side. The user interface typically provides easy access to a technical specification associated with each pilot to facilitate selection of one pilot as compared to another.

Responsively, the platform then provides (e.g. via SAS) a special secured connection pipe aka "access channel" to run the pilot and/or prediction analytics based on analysis of events going through this pipe in the course of the pilot, typically including periodic sampling of KPIs e.g. via a separate session. KPIs may be sampled on occasion or periodically, using any suitable period such as, say, once per second, per 5 seconds or per 10 seconds.

Each access channel may provide a network connection between a particular pilot, and an API, data, or service which may function as a software testing environment. Example: one access channel may connect a certain end-user e.g. startup directly to an enterprise-specified database or SaaS service such as, say, Amazon's Redshift database (aka data warehousing service) or Google's BigQuery database or any other suitable cloud data warehousing service. It is appreciated that from the start-up's "viewpoint", the channel typically extends from the start-up to the IP of the platform since the platform serves as a proxy providing the start-up with a network connection to a SaaS service e.g. software testing environment, via the platform.

Typically, each KPI characterizes an aspect of the data flow through an individual access channel at an individual point in time. According to certain embodiments, prediction analytics are performed on the KPIs thereby to generate predictions e.g. as described herein, using any suitable technology such as neural networks or even regression analysis. Typically, the server determines, on occasion e.g. periodically, whether the prediction analytics should be redone, thereby to generate new predictions or whether the situation has remained sufficiently static such that the existing predictions are still valid. The server may do this by comparing newly sampled KPIs with older KPIs, using any suitable technique such as analysis of variance. If (and only if) change in the KPIs over a given threshold is detected, new predictions may be generated.

KPIs may include "performance" KPIs applicable to substantially any pilot (many examples of such KPIs are detailed below) and application-specific KPIs which are specific, say, to a particular enterprise running a specific pilot. KPIs may even, optionally, include optional business KPIs e.g. quantifying cost of installation of a particular pilot.

KPIs may be stored in a big data server; the server associated with the platform may then access the big data server e.g. to predict the effect of piloted product on KPI deemed important for an individual enterprise to facilitate moving the pilot to live production. The platform is advantageous inter alia because each enterprise integrates only once, with the system, then is able to easily launch multiple start-ups without integrating separately with each and every one of them.

Any or all of the following embodiments may be provided:

Embodiment 100

An end-to-end "pilot as service" system operative for software pilot testing, the system comprising a server including at least one processor and operative for generating a set of at least one software testing environment/s simultaneously serving plural clients from among a first plurality of enterprise clients, the environment being operative for concurrently running plural proof-of-concept tests for respective plural software products each being tested ("pilots"), on behalf of an individual start-up client from among a second plurality of start-up clients, by an individual one of the population of enterprise clients; a registration functionality, on the processor, operative for pre-registering at least one of: enterprise clients from among the first plurality of enterprise clients, and start-up clients from among the second plurality of start-up clients; and a dashboard functionality, on the processor, operative for presenting at least one result of at least one proof-of-concept test to each client which has pre-registered using said registration functionality.

Embodiment 101

A system (or method) comprising:

A server including at least one processor and operative for generating a set of at least one software testing environment/s simultaneously serving plural clients from among a first plurality of enterprise clients, the environment being operative for concurrently running plural proof-of-concept tests for respective plural software products each being tested, on behalf of an individual start-up client from among a second plurality of start-up clients, by an individual one of the population of enterprise clients; and a registration functionality, on the processor, operative for pre-registering at least one of:
enterprise clients from among the first plurality of enterprise clients, and start-up clients from among the second plurality of start-up clients; and
a dashboard functionality, on the processor, operative for displaying at least one result of at least one proof-of-concept test to each client which has pre-registered using the registration functionality.

Embodiment 102

A system or method according to embodiment 101 wherein the software environment resides on a cloud and the clients interact with the software environment via a remote connection.

Embodiment 103

A system or method according to embodiment 101 wherein the set of software environment/s includes only one software environment simultaneously serving plural clients.

Embodiment 104

A system or method according to embodiment 101 wherein the system is agentless and nothing need be installed at client premises and wherein integration time with clients is near zero.

Embodiment 105

A system or method according to embodiment 101 wherein the system is based on SaaS (software as a service) technology and provides access from at least one client to at least one layer of integration employed by the tests.

Embodiment 106

A system or method according to embodiment 105 wherein the at least one layer of integration comprises an API layer.

Embodiment 107

A system or method according to embodiment 105 wherein the at least one layer of integration comprises a data layer.

Embodiment 108

A system or method according to embodiment 101 wherein the SaaS technology creates an Intelligence engine that automatically embeds at least one enterprise client's production cloud.

Embodiment 109

A system or method according to embodiment 101 wherein the system comprises a wizard-based process of platform discovery and exposure including provision of secured access to at least one layer of integration.

Embodiment 110

A system or method according to embodiment 106 wherein the API layer provides logging of access and various usage metrics.

Embodiment 111

A system or method according to embodiment 101 Wherein a wizard-based process provides at least one client with secured access to at least one Data/RDBMS/BigData source.

Embodiment 112

A system or method according to embodiment 101 wherein a wizard-based process provides at least one client with secured access to Source control.

Embodiment 113

A system or method according to embodiment 101 wherein a wizard-based process provides at least one client with secured access to the Cloud Instance/VPN server itself.

Embodiment 114

A system or method according to embodiment 111, 112 or 113 wherein the secured access comprises at least one access channel which may optionally, if desired, be read-only (e.g. Read-only Secured Access (ROSA)).

Embodiment 115

A system or method according to embodiment 101 wherein Integration with an Enterprise client, given a Private cloud environment, includes prompting an optional read-only access user to access the running cloud environment allowing the system to search on disk, run native OS utilities, and perform remote analysis to discover running application servers.

Embodiment 116

A system or method according to embodiment 101 wherein Integration with an Enterprise client, given an On-premises environment (VPN-based premises access), includes creating an optional read-only access user in the VPN environment, and providing an access IP.

Embodiment 117

A system or method according to embodiment 101 wherein the system provides serialization of the proof-of-concept process.

Embodiment 118

A system or method according to embodiment 102 wherein at a cloud access level, each start-up client is granted access directly to the cloud instance.

Embodiment 201

A system (or method) comprising:
a server including at least one processor and operative for generating a software testing environment simultaneously serving plural clients from among a first plurality of enterprise clients, the environment being operative for concurrently running plural proof-of-concept tests for respective plural software products each being tested, on behalf of an individual start-up client from among a second plurality of start-up clients, by an individual one of the population of enterprise clients;
a dashboard functionality, on the processor, operative for displaying at least one prediction analysis result of the plural proof-of-concept tests to each client which has pre-registered using the registration functionality; and
optionally, prediction analysis functionality, on the processor, which may for example comprise at least one neural network or linear regression process which may be triggered by at least one analysis of variance (ANOVA) to generate at least one prediction analysis result.

Embodiment 202

A system or method according to embodiment 201 and also comprising a registration functionality, on the processor, operative for pre-registering at least one of:
enterprise clients from among the first plurality of enterprise clients, and
start-up clients from among the second plurality of start-up clients; and
a dashboard functionality, on the processor, operative for displaying at least one result of at least one proof-of-concept test to each client which has pre-registered using the registration functionality.

Embodiment 203

A system or method according to embodiment 201 wherein, optionally, independent variables for the ANOVA include characteristics e.g. KPI's, of the enterprise, cloud or production.

Embodiment 204

A system or method according to embodiment 201 wherein, optionally, dependent variables for the ANOVA include characteristics e.g. KPI's of the software which the pilot is testing such as but not limited to any of the many performance KPIs described herein. Possible examples of performance KPIs: Network measurements such as but not limited to network strength; how much memory the software employs, how much of the server's CPU the software employs; or for databases, number of SQLs running concurrently on database.

Embodiment 205

A system or method according to embodiment 201 wherein dependent variables for the ANOVA include: application-specific KPI's including at least one characteristic e.g. KPI of the software which the pilot is testing, which the software is capable of measuring; and (optionally) business KPIs.

Embodiment 206

A system or method according to embodiment 201 wherein the prediction analysis result is quantitative and is presented in a format which is standard over proof-of-concept tests, thereby allowing a client associated with multiple proof-of-concept tests of multiple respective software products being tested, to compare prediction analysis results of the multiple software products thereby to identify superior software products.

Embodiment 207

A system or method according to embodiment 201 wherein if data from software testing has accumulated for generation of at least one prediction analysis result, and new data becomes available henceforth, a suitable computational process is performed on the new data to determine whether or not the new data is significant enough to warrant re-computation of the at least one prediction analysis result.

Embodiment 208

A system or method according to embodiment 201 wherein the system allows at least one client, associated with an individual proof-of-concept test for an individual software product being tested, to simulate pressure or congestion in the environment, by accepting from the client at least one pressure or congestion parameter to be simulated via the dashboard functionality and, responsively, using at least one computational process, e.g. neural network or even linear regression, to predict at least one performance characteristic of the software product given the pressure or congestion parameter, based on performance data gathered at various levels of pressure or congestion, while the proof-of-concept test was being performed for the software product.

Embodiment 209

A system or method according to embodiment 201 wherein each end-user interacts with the system to create an optionally read-only user credential.

Embodiment 210

A system or method according to embodiment 209 wherein each end-user interacts with the system using an interface which has a SaaS service look-and-feel to create an optionally read-only user credential.

Embodiment 212

A system or method according to any of the preceding embodiments wherein the predictive analysis results quantifies how an individual pilot (=proof of concept) may behave under different platform states e.g. during critical and peak operation.

Embodiment 213

A system or method according to any of the preceding embodiments wherein the predictive analysis results quantifies how an individual pilot (=proof of concept) may behave during critical and peak operation, relative to other pilots.

Embodiment 214

A system or method according to any of the preceding embodiments wherein the prediction analysis is operative to:
compute an estimation for at least one KPI at a peak network time and
indicate a probability of such a peak, based on accumulated server knowledge, thereby to present a quantification of expected future behavior of the piloted product.

Embodiment 215

A system or method according to any of the preceding embodiments wherein the prediction analysis functionality is operative to find a neutral network (or other suitable model e.g. regression linear equation) of pilot's performance KPIs; and wherein changes in the equation are effected depending at least one whether ANOVA shows a change in pilot CPU and Memory significant enough to change the KPIs to an extent exceeding at least one predetermined threshold.

Embodiment 216

A system or method according to any of the preceding embodiments wherein measured KPIs are accumulated e.g. as JSON files in a Hadoop file system.

Embodiment 217

A system or method according to embodiment 216 wherein the accumulated KPIs are organized using Apache Flink as CSV files.

Embodiment 218

A system or method according to any of the preceding embodiments wherein ANOVA is measured e.g. using Apache Mahout.

Embodiment 219

A system or method according to any of the preceding embodiments wherein, optionally, an H2O server is employed for performing the linear regression process. Use of neural networks e.g. as described herein, may be preferable.

Embodiment 301

A system (or method) comprising:
a server including at least one processor and operative for generating a single software testing environment simultaneously serving plural clients from among a first plurality of enterprise clients, the environment being operative for concurrently running plural proof-of-concept tests for respective plural software products each being tested, on behalf of an individual start-up client from among a second plurality of start-up clients, by an individual one of the population of enterprise clients; and
Pilot Security functionality, on the processor, operative for preventing any first start-up client from among the second plurality of start-up clients from affecting a proof-of-concept test for any software product being tested, on behalf of any second start-up client from among the second plurality of start-up clients.

Embodiment 302

A system or method according to embodiment 301 and also comprising a registration functionality, on the processor, operative for pre-registering at least one of:
enterprise clients from among the first plurality of enterprise clients, and
start-up clients from among the second plurality of start-up clients; and
a dashboard functionality, on the processor, operative for displaying at least one result of at least one proof-of-concept test to each client which has pre-registered using the registration functionality.

Embodiment 303

A system or method according to embodiment 301 wherein clients interact remotely with the environment via a secure connection.

Embodiment 304

A system or method according to embodiment 303 wherein the secure connection employs any suitable network protocol for exchanging data over at least one IP network such as, say, Remote Desktop Protocol (RDP), SSH. Generally, any suitable technology may be used to define access channels and specific mention of SSH or RDP or any other specific technology is intended to be merely by way of example.

Embodiment 305

A system or method according to embodiment 301 wherein the system is based on SaaS technology and provides access from at least one client to at least one layer of integration to be employed for the tests.

Embodiment 306

A system or method according to embodiment 305 wherein the at least one layer of integration comprises a layer which provides at least one client with secured access to source code at the server.

Embodiment 307

A system or method according to embodiment 302 wherein the server discovers at least one enterprise's running BigData and Application Servers and visually represents them to the end-user e.g. CTO.

Embodiment 308

A system or method according to embodiment 302 or 307 wherein at least one enterprise client uses the dashboard to define which of the enterprise's servers/services he wants to expose to at least one start-up client associated with the enterprise client and wherein, responsively, the Pilot Security functionality airs a security channel to only those servers/services.

Embodiment 309

A system or method according to embodiment 302 or 307 wherein at least one enterprise client uses the dashboard to define how deeply to expose at least one enterprise server/service to at least one start-up client associated with the enterprise client and wherein, responsively, the Pilot Security functionality airs a security channel defined to expose each server/service to the at least one start-up client, only as deeply as the enterprise client has defined.

Embodiment 310

A system or method according to embodiment 302 wherein each client, having pre-registered, gains immediate access to a secure client-server channel over which to run proof-of-concept testing for software product/s associated with the client.

Embodiment 311

A system or method according to embodiment 303 wherein the secure connection secures access to each enterprise client's data and servers.

Embodiment 312

A system or method according to embodiment 301 wherein the server comprises an SSH server and clients comprise SSH clients which interact with the environment via the secure connection which comprises an SSH channel ensuring secure client-environment communication over a network assumed to be insecure.

It is appreciated that SSH, mentioned herewithin by way of example, is indeed but one example of an access channel that may be provided herein, and is not intended to be limiting.

Integration with external cloud services such as but not limited to some or all of: Docker, Big Query, Thrift, RDC, SSH, Redshift, and any other suitable alternative, may be provided.

Embodiment 313

A system or method according to any of the preceding embodiments wherein security of shared data is provided at least by using a "man in the middle" approach to decrypt and analyze SSH/SSL incoming traffic.

Embodiment 314

A system or method according to any of the preceding embodiments wherein security of shared data is provided at least by using at least one Application Firewall OSS.

Embodiment 315

A system or method according to embodiment 314 wherein the Application Firewall OSS employs AppSensor technology or any other suitable firewall technology.

Embodiment 316

A system or method according to embodiment 314 wherein the Application Firewall OSS employs Snort technology or any other suitable firewall technology.

Embodiment 317

A system or method according to any of the preceding embodiments wherein security of shared data is provided at least by analyzing incoming traffic for at least one pilot-based threat.

Embodiment 318

A system or method according to any of the preceding embodiments wherein the at least one pilot-based threat includes at least one of:
corrupting shared memory;
interrupting other pilot processes; and
attempts at reverse engineering.

Embodiment 319

A system or method according to any of the preceding embodiments wherein an optional Pre-approve mode is provided and when the system is in this optional Pre-approve mode, start-ups seeking to begin a session with the system, can only access their enterprise's platform when an end-user acting for the enterprise approves the access.

Embodiment 320

A system or method according to any of the preceding embodiments wherein the server is operative for exposing only certain predefined portions of at least one enterprise's data.

Embodiment 321

A system or method according to any of the preceding embodiments wherein the predefined portions include only the filtered fragment in both Big Data and RDBMS segments.

Embodiment 322

A system or method according to any of the preceding embodiments wherein the Pilot Security functionality is operative to detect events in which a first pilot tries to access a resource previously allocated to, or deemed to belong to, a second pilot.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

FIGS. 1 2, 5, 7, 10-12 are diagrams of various aspects of various embodiments as described in detail herein.

FIG. 3 is an example query which may be provided in accordance with certain embodiments.

FIGS. 4, 6 are simplified flows including operations some or all of which may be provided, suitably ordered e.g. as shown, according to certain embodiments.

Figure 1:
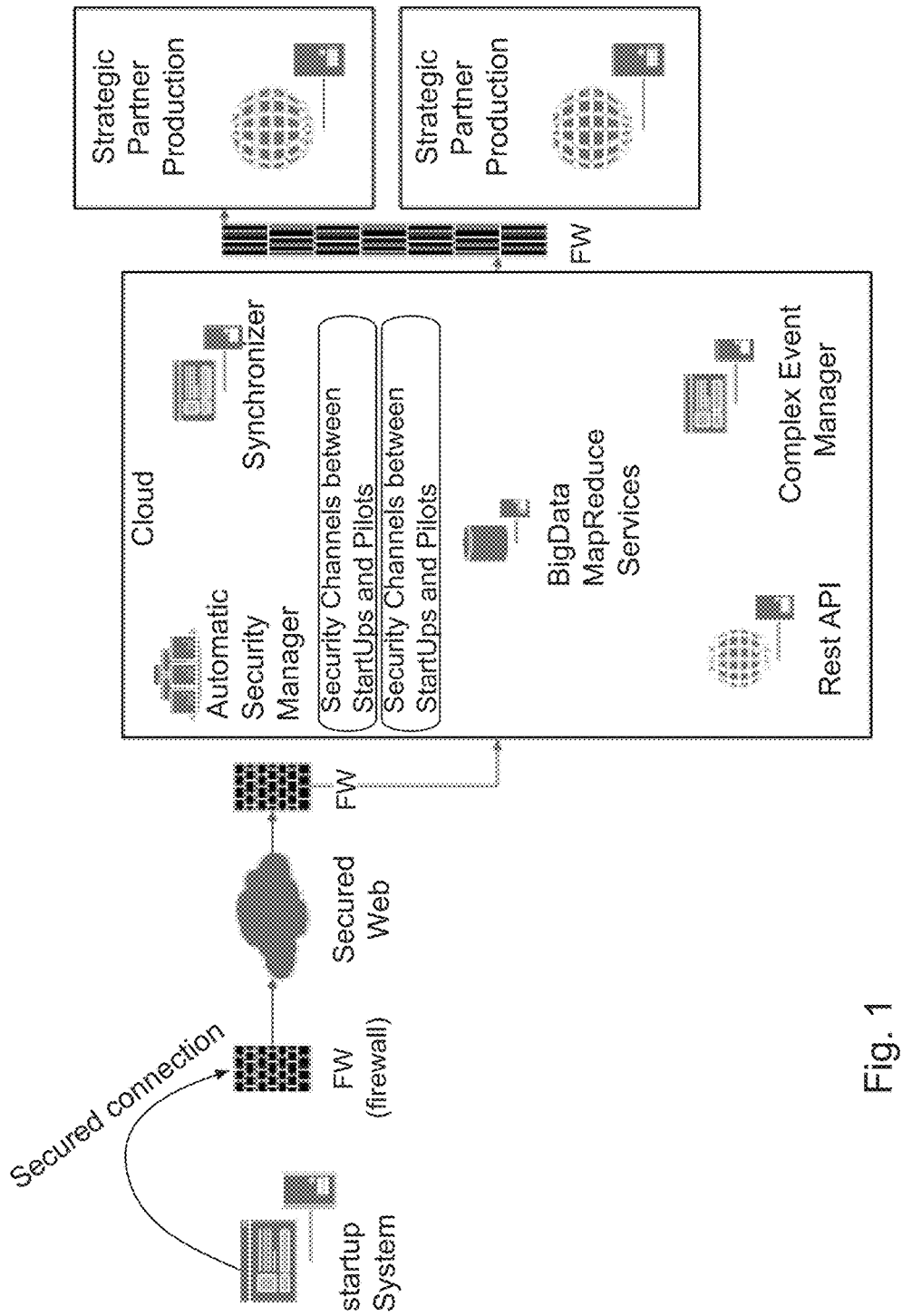

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software, firmware, hardware or any combination thereof. Functionality or operations stipulated as being software-implemented may alternatively be wholly or fully implemented by an equivalent hardware or firmware module and vice-versa. Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS OF THE INVENTION

To date, each Proof of Concept from among so many being carried out, is too often a complex and difficult project which may include the following operations:

Integration between start-up and enterprise product

Putting the enterprise's R&D resources out-of-scope to support the pilot

Solving internal bugs of the enterprise+external bugs of the piloted product

Evaluating the pilot results.

The system shown and described herein typically provides some or all of:

Integration, of a long process requiring many resources, into a wizard-led process, which guides the CTO in selecting the cloud/on-premise resources to be exposed. The start-up receives clear, credential-based SSH/SSL access to the pilot environment through the system engine (aka server).

zero R&D resources are needed to perform a pilot. Any personal communication may be done only after achieving understandable results. This is done providing clear, standardized access to the pilot environment, where start-ups instantly get everything which may be needed for the pilot.

evaluate pilots by snap-shotting of predefined KPIs and predicting KPI behavior within conditions related to peak pressure on the platform.

Certain embodiments seek to provide a technology hub aka platform that provides convenient, automatic secure access to all layers of integration which may be needed in order to efficiently support viable pilots performed by software startups; including all or any subset of the following:

API such as for example SOAP API

Data e.g. (say) Redshift, BigQuery among others secured access to cloud secured access to source code Tunnel to Docker containers and registries (Docker software automates deployment of Linux applications inside software containers). It is appreciated that certain server virtualization methods allow multiple isolated user-space instances (aka software containers) to co-exist, each of which may look and feel, to its users, like a real server.)

It is appreciated that more generally, any suitable type of access channel may be employed.

Certain embodiments of the present invention provide a "software pilot as service" e.g. SaaS platform typically having at least 2 separate types of end-users—startups and enterprises. The platform typically supports software pilot monitoring including providing predictive analytics thereby to obtain insights about each pilot's functioning. Typically, each Start up aka ISV which has, via the platform, registered to participate in a given pilot typically defined by a particular enterprise, receives via the platform a "POC package" which may include an RFP, access to testing environment, system doc about enterprise systems, and/or a messaging channel with a relevant enterprise (typically, to a CTO human user associated with the enterprise). For example, all or any subset of the following may be received by the startup, typically from that particular enterprise, via the platform:

1. an rfp (requirements document) which may be a natural language document which defines desired requirements for the pilot 2. a system document that defines an environment—cloud system that allows each startup to install its pilot software in that environment.

3. access to client system e.g. secured access to source code which client uses for pilot 4. messaging channel to communicate with client e.g. (optionally: read-only) secured access by each end user e.g. each enterprise and/or start-up, to cloud hosting the platform. Embodiments herein are operative for reshaping the intersection of technology and enterprises for all pilot participants. Certain embodiments seek to provide, for at least one enterprise, some or all of: one time integration with the platform, automatically created testing environment with simulated API and Data (typically generated or pre-existed in the platform's Data Repository) representing real enterprise production, data about each candidate ISV for various pilots being run by the enterprise, and/or a predictive engine generating predictions about other cloud environments.

In the multi-tenant environment shown and described herein, where startups can discover organizations open for a pilot on specific topics (say BI, security, new UI or gadget . . . ). willing piloting organizations may, as part of their registration process, expose their POC sandbox environment on the system (to include mock data, APIs etc.). The startup may then "acquire" and run the pilot via a special secured connection pipe, e.g. as described herein. The platform's server can then handle and analyze all the events going through this pipe.

Typically, KPIs such as the amount of CPU or power employed, are sampled e.g. periodically, while the remote channel or "pipe" is in the air. For example, sampling might occur every few minutes over a period of days or weeks. Sampled KPIs typically include both dependent and independent variables, e.g. for regression and/or ANOVA purposes as described in detail hereinbelow. Dependent variables may include those pertaining to the product in the test environment of the enterprise. The independent variables may include the general metrics of the test environment. ANOVA is typically used to identify situations in which a handful of independent variables provide the majority of the variance in dependent variable/s. Both parties get access to standard and extended KPI reporting (scalability, performance, security, I/O . . . ). The system can behaviorally analyze and predict the effect of piloted product on KPIs which may be defined by an Enterprise CTO end-user and, doing that, may give much more confidence for moving the pilot to the live production. According to certain embodiments, the system sometimes declines to predict and a message to the end-user is provided accordingly. KPIs may for example include some or all of: Maximum (and average, median, mode) CPU usage by start-up x within measurement period y; Maximum (and average, median, mode) physical memory usage by start-up x within measurement period y; number of read/write requests by start-up x within measurement period y; number of (total, waiting, active) threads, Numbers of bytes written from/read to network by start-up x within measurement period y; KPI's relating to Power usage effectiveness (PUE) or Disk space allocation, and so forth. For example, kpilibrary.com defines many useful Key Performance Indicators. System's Software as service hub may comprise an intelligence engine that automatically embeds the strategic partner's production cloud and gives security access to customers (startups). The cloud-based, decentralized platform typically aims to handle the secured access to preregistered startups, conjoined within metering/monitoring dashboards for both sides—strategic partner and customer-startup.

The platform shown and described according to certain embodiments, has the potential to change the way tech start-ups acquire customers and enterprises discover new innovations. It dramatically streamlines the pilot process. Start-ups are able to quickly accomplish proof of concept and customer acquisition, while enterprises gain greater access to proven technology. Early-stage start-up investors can more clearly see actual value and potential for new technologies through the standardized, quantitative analysis the server can create for each pilot project.

Example System Architecture

Certain embodiments of the system shown and described herein allow the startup to choose a suitable enterprise for the pilot, and then create a unique channel of connection that provides secured, monitored and behaviorally analyzed access to the previously exposed pilot production environment of the enterprise. Such a standardized approach dramatically simplifies and reduces the pains associated with integration time and the inability to observe and evaluate the pilot results within real production conditions.

Figure 5:
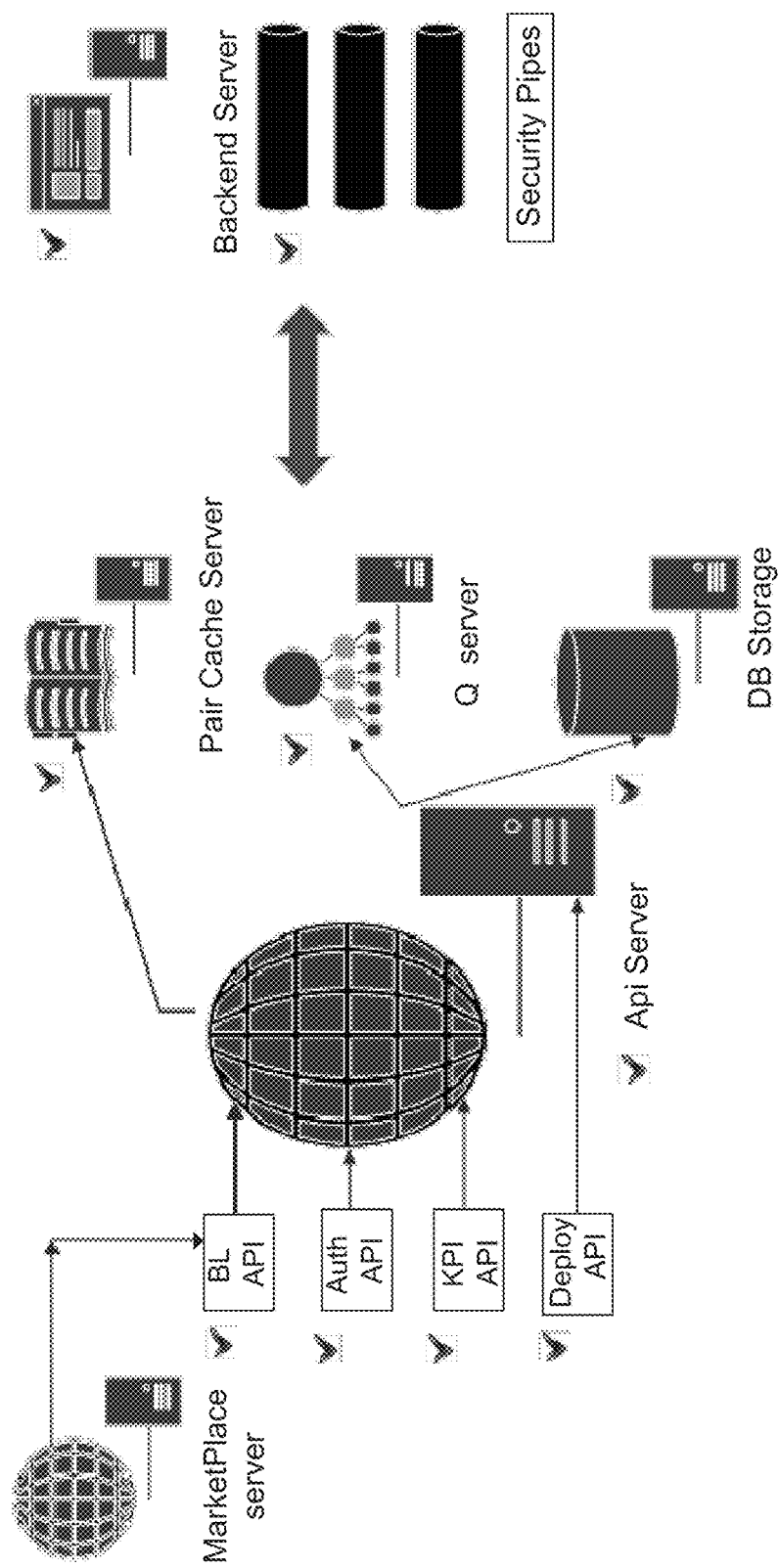
Figure 11:
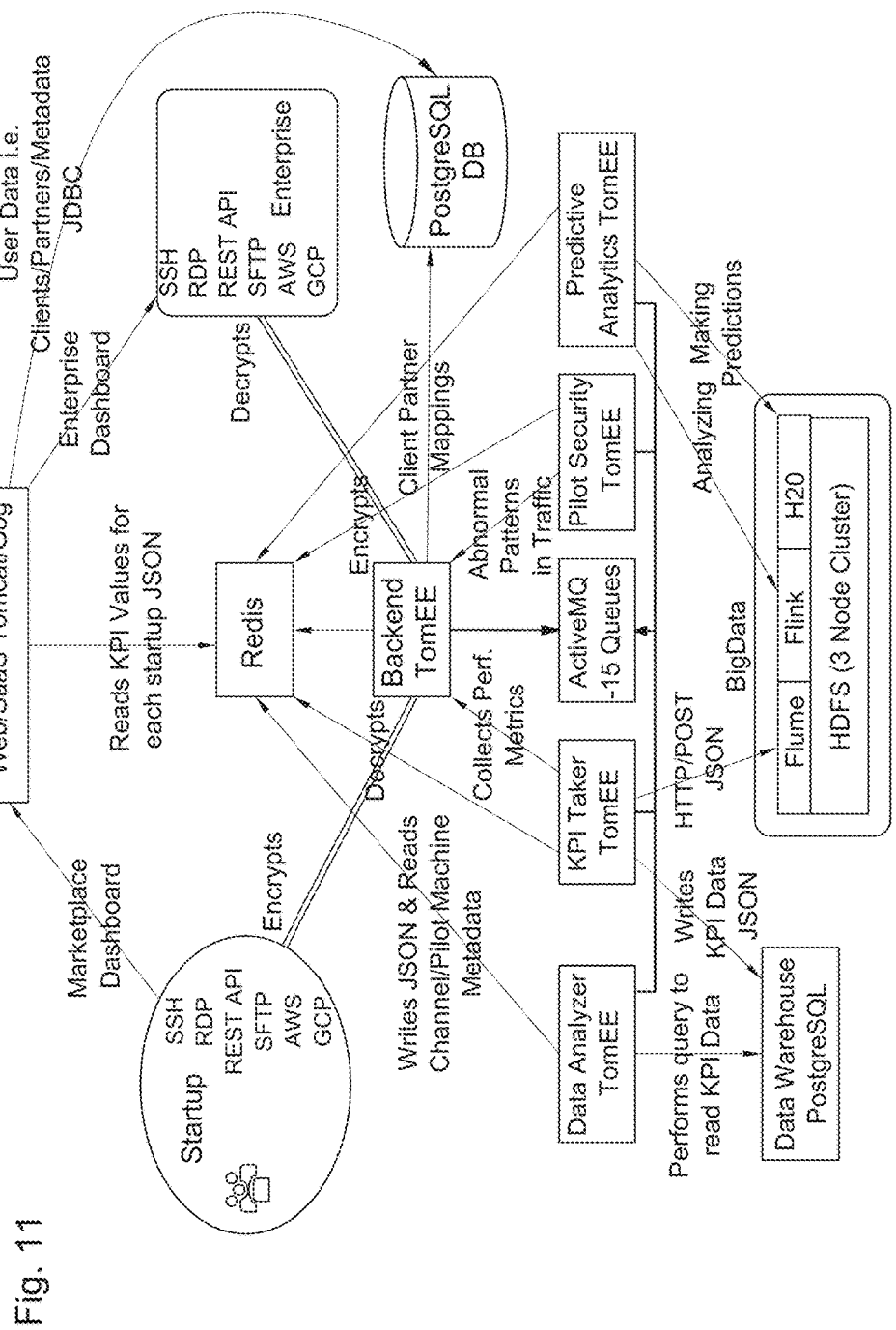
Figure 12:
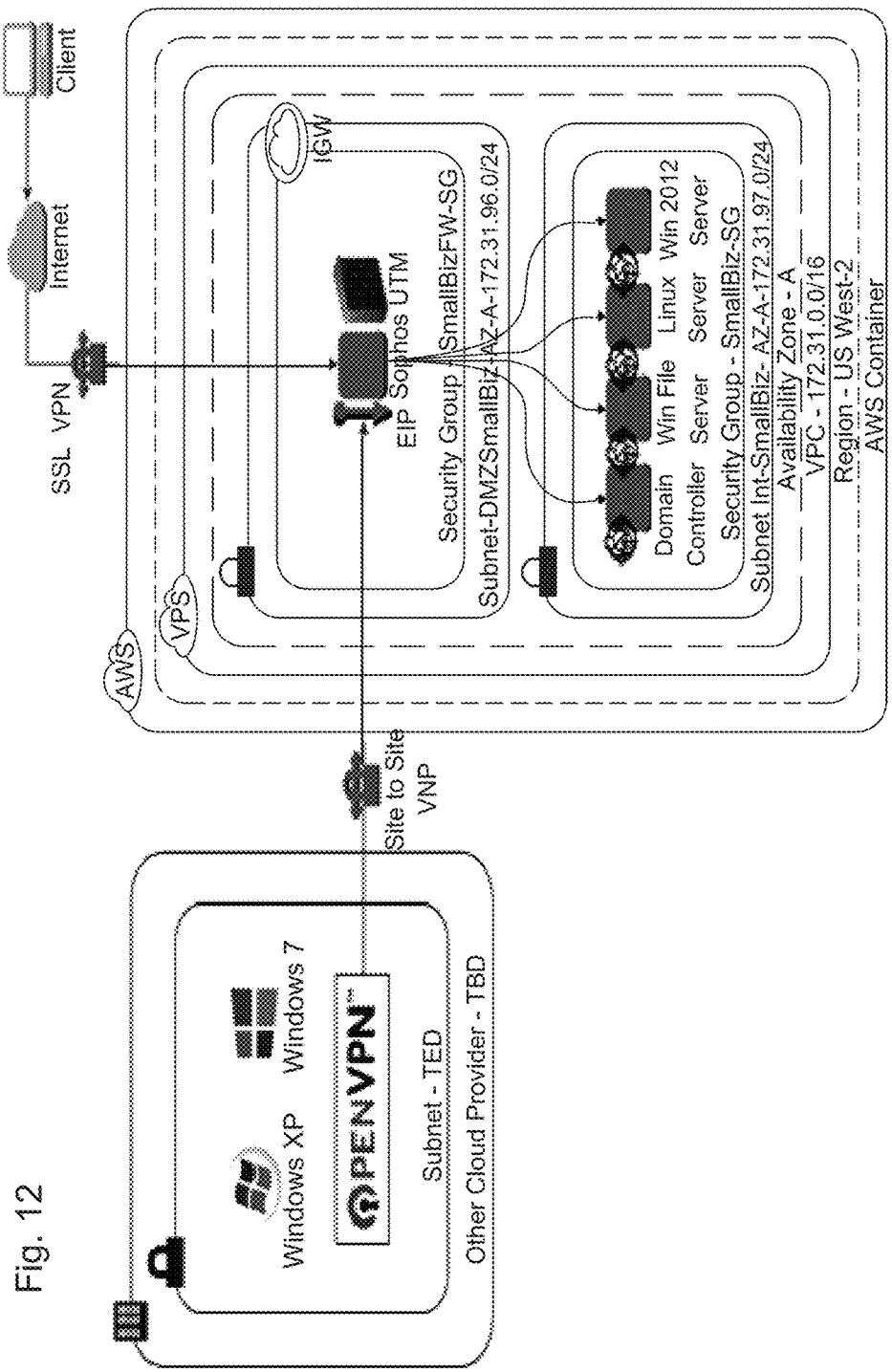

A simplified overview of the platform according to certain embodiments, is shown in FIG. 1. Typically, plural software testing environments are provided within a single server thereby to allow plural proof-of-concept operations to be managed efficiently, typically including decision support comparisons between the plural proof-of-concept operations. The server of FIG. 1, or any server aka engine described herein, may include any or all of the components shown in FIG. 5, typically implemented in software. The engine may comprise some or all of: any suitable firewall or security appliance, automated data anonymization functionality, functionality for imposing a security limitation on read, a preapprove mode, and pilot tailored application security functionality, e.g. as described in detail below. FIG. 11 is an example architecture for a platform constructed and operative in accordance with certain embodiments; some or all of the illustrated functional blocks may be provided and of course, any block may be implemented either as indicated or using other known technologies or software off-the-shelf or open source products. FIG. 12 is an example proof-of-concept environment existing on top of a cloud-based server as shown. A suitable Network Traffic Generator and Analyzer may be employed in conjunction with the embodiment of FIG. 12 (or other embodiments shown and described herein), such as, for example, the Network Traffic Generator and Analyzer available from Ostinato.org.

Services provided by the platform typically comprise web-based services made available via suitable website/s e.g. SaaS platform/KPI Suites, perhaps associated with suitable web pages.

Each end-user e.g. enterprise or start-up may submit electronic data through the services. Each start-up typically provides continuous access of at least one enterprise, and of the platform itself, to at least one "software Testing Environment" typically including software and/or hardware associated with the start-up on which at least one designated enterprise performs a specific POC (proof of concept) typically in cooperation and coordination with the start-up. The start-up typically maintains its Testing Environments online and operational for as long as the startup is registered with the platform and is expected to prevent unauthorized access to or use of its Testing Environment and to maintain the Testing Environments free and protected from Malicious Code.

The platform streamlines the pilot process by facilitating proof of concept demonstrations ("POC"s) between start-ups which sign in to the Platform and enterprises ("Partners"). The platform typically facilitates an open communication and discovery process between startups and enterprise, which supports enterprise/start-up cooperation and coordination.

The platform typically is operative to host, copy, transmit, display, analyze, process and/or adapt startup Data e.g. as described herein and to provide the startup Data to an enterprise which is that startup's POC Partner, e.g. so as to provide services aka functionalities described herein such as but not limited to predictive analysis of a startup's proof of concept for disclosure to enterprise/s associated with that POC. The platform typically displays to end-users a list of POCs each startup has performed through the platform.

Typically start-ups and enterprise can communicate directly with one another to Partner on a particular POC, through suitable tools provided on the platform. The platform may impose limitations, such as but not limited to some or all of: limits on disk storage space, on broadband data usage and on the number of POCs conducted at any given moment. Typically, the platform provides real-time information to enable at least one end-user monitor its compliance with such limitations.

Security functionality is typically provided, e.g. as described herein, so as to detect illegal startup activity e.g. attempts of startups to gain unauthorized access to the platform or related systems or networks, to use a Testing Environment to store or transmit Malicious Code, to attempt to access platform software or data or systems or networks related thereto, and other illegitimate startup activity. If any of these are discovered by the security functionality of the platform, the platform automatically applies suitable penalties e.g. may disconnect the end-user from the platform.

It is appreciated that different enterprises may have different preferences for how to define the software testing environment to be provided to a particular pilot which the enterprise desires to run via the platform shown and described herein. Typically, the enterprise user interface presents various possible preferences and allows each enterprise to decide on a preference either globally or for a particular pilot or set of pilots.

For example, one enterprise may already have built a software testing environment, e.g. residing on its server or cloud, which is now ready-to-go and the enterprise hence desires to use this for a particular pilot. The platform herein may provide an access channel to that environment, e.g. via a suitable API. Or, the enterprise may elect to install its ready-to-go software testing environment on an "empty" server associated with the platform described herein e.g. on top of the platform's cloud (it is appreciated that the term server as used herein may always include a plurality of servers e.g. one or more actual computers may function as a server). An enterprise is typically also given the option of acquiring data from the platform server. An enterprise is typically also given the option of conducting a discovery process at the enterprise's physical or virtual premises, e.g. in order to allow the platform server to generate a simulated testing environment e.g. to simulate an existing API that the enterprise has developed and wishes to employ for certain pilot/s. It is appreciated that mockability of data and/or applications may be provided where "mockability" refers to functionality for simulation of the enterprise's data and/or applications, typically following a suitable discovery process.

It is appreciated that an automatic API generation module, if provided, typically includes a framework and a generator. The generator generates APIs and a business logic flow according to a metadata specification. The generated code relies on the framework code.

Each business flow for which it is desired to generate code is typically described by a separate metadata file e.g. in JSON format. The metadata may for example describe relevant database table structure and/or limitations, and/or business logic operations such as but not limited to: create business data, update business data, retrieve instance/s of business data. Metadata also typically describes validation rules for input data, indicating e.g. what values are allowed, how to check their validity, and format of the output data. The generated code typically includes at least one automatic test to validate correctness of the generated business flow code.

After metadata definition and test execution have been performed successfully, a deliverable web application containing the framework and the generated business flow is generated, for deployment in or delivery to a test environment operative in accordance with embodiments of the present invention.

Strategic Partner Software Flows:

To allow enterprises (aka partners) to reduce their integration time to minimum a wizard-based process of platform discovery and exposure typically provides secured access to some or all of the following layers:

a. API/REST/SOAP (with logging of access and different usage metrics), b. Secured Access (which may, if desired, even be Read-only e.g. ROSA) to any Data/RDBMS/BigData source, or to the Cloud Instance/VPN server itself, or to Source control.

c. Remote Access to Cloud Instance/VPN server itself, or to Source control. (e.g. Protocols such as but not limited to SSH/RDC) or any other suitable alternative d. Remote Access to external Cloud Services such as but not limited to AWS Redshift, Google BigQuery or any other suitable alternative e. Special protocol access such as but not limited to DockerClient, BigData Thrift or any other suitable alternative.

During and after the pilot, Strategic enterprise partners are also able to process, monitor and judge the running pilots via a specialized dashboard, where they can also see predictive information regarding estimated pilots behavior at selected times and/or over selected time periods in real production conditions.

Start-Up Customer Software Flows

When registering, start-up customers submit a short description of their endeavor, and register under several existing topics, or under a new one. The customer may typically be prompted to select an enterprise partner, perform the payment procedure, and receive access to the exposed level of pilot production. After accepting any legal documents which may be pre-incorporated into the platform, the start-up may then be able to get a secured access channel to enterprise partner data (or any other credentials which may be needed for the pilot). Registration and the ability to "buy" a pilot through the system dramatically reduces the time typically needed to acquire a comparable pilot. Once "in," start-up customers gain immediate access to a secure channel for running their pilot.

Integration with Enterprise Environment

Conventionally, discovery and analysis, in the majority of cases, involves initial trials, and POCs (proof of concept) performed on separately running instances, not on the platform itself. Certain embodiments provide some or all of several advantages described herein in relation to the functionality provided e.g. very low time required for integration and secure access to the enterprise partners' data and servers.

Private Cloud Environment

In this case, the platform typically requires no more effort from an end-user than many cloud-based SaaS services do. The platform typically may optionally request to create a read-only access user to access the running cloud environment (for example, IAM user on Amazon) that supports:

search on disk, run several native OS utilities, and perform other remote analysis to discover the running application servers.

On-Premises Environment

In case of VPN-based premises access, the same procedure may be employed. The read-only (optionally) access user is created in the VPN environment, where the server provides an access IP. The server supports the majority of Open-Source VPN clients.

Smart Analysis & Deployment Process

Figure 2:
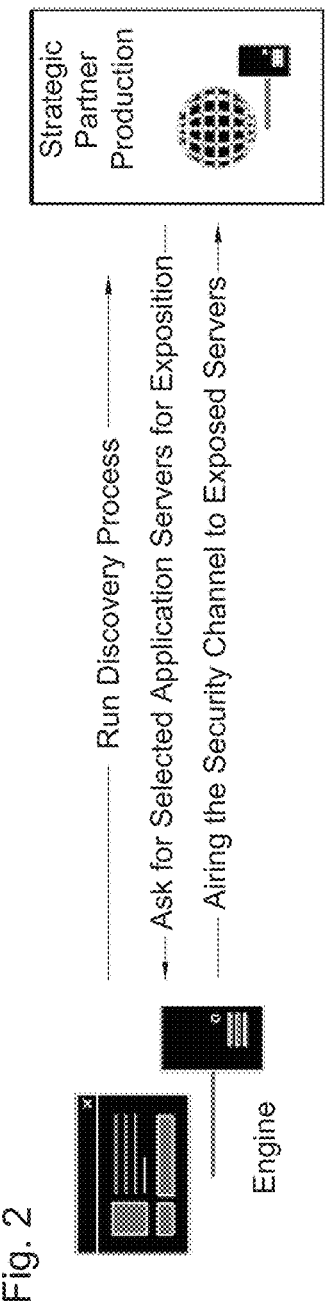

The Smart Analysis and Deployment procedure may take but a few minutes and may include some or all of the following operations, e.g. as shown in FIG. 2:

a. The engine discovers running BigData and Application Servers and visually represents them to the CTO
b. Using the very simple and user-friendly dashboard, the CTO chooses which servers/services he wants to expose and how deep.
c. The engine airs the security channel to those servers.

After the airing of the security channels, various start-ups can buy access to those channels and can start POC there, while the engine aka server manages security, auditing, and handling of all the traffic, as well as for behavioral predictive analytics.

Pilot Evaluation Decision Support by Provision of Key Performance Indicators (KPIs) to Compare Pilots to One Another Efficiently:

Conventionally, it has been very difficult for CTOs to evaluate pilot results because there was no objective "picture." For the most part, CTOs did not know how pilots would behave during critical and peak operation. The whole evaluation process was typically very subjective.

Prediction of KPI Behavior Under Different Platform States

KPI goals typically are not only monitored, but also predicted for behavior within stressful conditions, so the CTO can make determinations regarding their future use.

KPI Findings in Event Auditing and KPI Prediction with Other Events

The platform typically may use new Apache Math Open Source to build linear quadratic regression models that explain KPIs by observed events. Use of neural networks e.g. as described herein, may be preferable.

The prediction of chance of such results may be done using Bayesian statistics and probability for the event.

The server typically uses a suitable algorithm which may employ functionality provided by some or all of: Apache Mahout, Weka and Esper to analyze multiple data streams in a very short period of time.

The calculated estimation for the KPIs at peak network times together with the probability of such a peak can present the observed picture of future behavior of the piloted product.

It is appreciated that handling of KPIs and predictive analytics may be based on any suitable big data techniques and may or may not be based on those specifically described herein by way of example.

Integration with Enterprise Environment:

Regarding discovery and analysis, conventional initial trials and POCs are often done on separately running instances, not on the actual production. The server typically, in contrast, provides almost a zero time integration while securing the access to the customer's data and servers. Two possible environments are now discussed:

Private cloud environment: In this case, the system may require of the human user no more effort than other cloud SaaS based services do. The platform typically asks to create a read-only (optional) access user to access the running cloud environment (for example IAM user on Amazon) that provides support for: search on disk, run several native OS utilities, perform other remote analysis to discover the running application servers. Those actions do not require installing any agent, and may be done by opening an SSH connection to the remote POC stage environment and using standard Linux OS shell commands.

On-premises environment e.g. VPN based: the same procedure as for Private cloud environments may be employed. The (optionally) read-only access user may be created on the VPN environment, where the server may provide an access IP. The server typically may support the majority of Open-Source VPN clients, such as but not limited to all or some of:

1. OpenVPN
2. HotSpot Shield
3. Amazon VPN
4. Gadmin VPN Client
5. Shrew Soft VPN Client
6. Viscosity VPN Client
7. VPN X Client
8. others A general scheme of connection in case of VPN-secured premises of partner may comprise the embodiment of FIG. 1, by way of example, where the connection between the engine provided in accordance with certain embodiments, and strategic partner production, comprises a VPN connection.

Events Auditing

Since the access channel is fully decrypted inside the server, the server may register and audit the incoming traffic to show a detailed report of using e.g. to support enterprise decision making Events are registered via Traffic Analysis tools.

The platform typically may use Esper tools to register and analyze events.

Hadoop Event Storage

Events may be registered and recorded as HDFS Json records on Hadoop cluster.

Apache Flink querying may be used to make a fast, map-reduce based fetching of data.

An example query is shown in FIG. 3.

Hive open source may be installed over the querying software to make querying and fetching of data suitable for desired reports.

KPIs Finding in Events Auditing and KPIs Prediction with Other Events

The platform typically may use new Apache Math Open Source to build linear quadratic regression models that explains KPIs by observed events. Use of neural networks e.g. as described herein, may be preferable.

Figure 4:
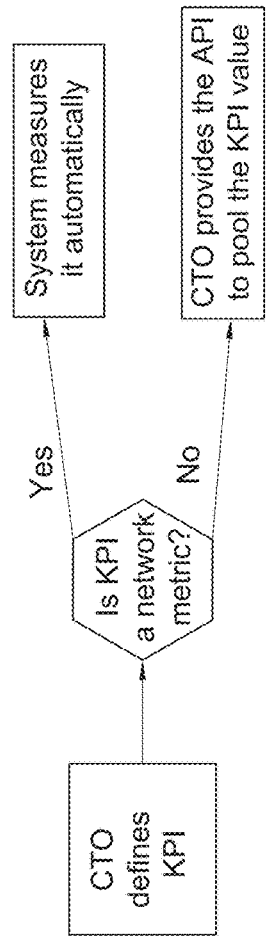

An example visual flow, for Prediction of KPI's behavior under different states of production, is illustrated in FIG. 4. KPI goals may not merely be monitored, but also predicted for behavior on stress conditions, so the CTO of an enterprise can decide regarding future use of KPIs.

Possible implementations of prediction analytics functionality, using at least one processor, may be characterized by some or all of the following:

The server typically samples KPIs via opened channels. This information is stored in BigData Hadoop disk as JSONs on disk. The platform typically may find a regression equation between each KPI and acting (e.g. performance) of piloted product, but use of neural networks e.g. as described herein, may be preferable. All standard KPIs may be predicted by memory and CPU of running pilot (or summary thereof). R and Mahout may be used to find a regression linear equation of pilot CPU and pilot memory on all observed KPIs although as aforesaid, use of neural networks e.g. as described herein, may be preferable.

Before changing the equation the system may determine, typically computationally, whether the change on pilot CPU and Memory was sufficiently significant to change the KPIs. Data may be stored on HDFS as JSON.

Anova (analysis of variance) may be used from http://commons.apache.org/proper/commons-math/userguide/stat.html. Anova may be used on Map/Reduce job.

The platform typically may use https://drill.apache.org/ to select the data from the storage.

H20 may provide Beta Epsilon coefficient vector as well as Intercept vector. Alpha may for example be 0.05.

This may be done in the flow of H2O, e.g. as shown in FIG. 6.

A neural network-based implementation for prediction analytics is now described in detail; it may be incorporated, wholly or in part, into any suitable computerized system for supporting decision making by an enterprise end-user which has defined a pilot with the goal of comparing several (say 3 or 5 or 10 or more) startups (software programs) each able to perform a task for which the pilot is defined. For example, the task may be to monitor certain aspects of the performance of some startup system module against the enterprise system. The comparing may be desired to support a decision on who to buy software from, or who to partner with. The system monitors each startup's performance (monitors plural KPIs representing the startup's performance) within a test environment generated for the pilot, once the startup's software has been detected in the test environment. Typically, the test environments for many pilots all coexist in the system shown and described herein, which may be on a cloud. Typically, a "virtual marketplace" is defined allowing enterprise end-users to provide pilots and allowing startup end-users to apply to participate in such pilots, typically after a human expert approves the startup applicant. The task may be a software task or may be a task performed by a "smart box" having both hardware and software components. Typically, the smart box's software's performance may be monitored and compared to the performance of other startups' software programs running within the same test environment, e.g. as shown and described herein.

A method which includes use of neural networks to generate predictions may include some or all of the following operations, suitably ordered e.g. as shown:

1. For each pilot, define specific measurable KPIs aka x-KPIs, and derivable KPIs (from the x-KPIs) aka y-KPIs. Typically, each pilot's KPIs are defined by selection from a "pool" of KPIs which may include hundreds of KPIs e.g. 200, 500, 800 or any other suitable number of KPIs. The pool of KPIs may for example include, say, the % of memory used by the startup software program in the test environment, at a given time t, or the % of CPU power used by the startup, at a given time t. Typically, the pool of KPIs includes groups of KPIs, such as some or all of:

(a) specific KPIs for each operating system such that a pilot using Windows may select some or all of the Windows KPIs such as Cpu Idle Rdc
    Cpu Info List Cache Size Rdc
    Cpu Info List Cores Per Socket
    Cpu Info List Length Rdc
    Cpu Info List Mhz Rdc
    Cpu Info List Total Cores Rdc
    Cpu Info List Total Sockets Rd
    Cpu Irq Rdc Cpu Nice Rdc
Cpu Perc Combined Rdc
Cpu Perc Idle Rdc
Cpu Perc Irq Rdc
Cpu Perc Nice Rdc
Cpu Perc Soft Irq Rdc
Cpu Perc Stolen Rdc
Cpu Perc Sys Rdc
Cpu Perc Wait Rdc
CPU RDC
Cpu Soft Irq Rdc
Cpu Stolen Rdc
Cpu Sys Rdc
Cpu Total Rdc
Cpu User Rdc
Cpu Wait Rdc
Disk Usage Queue Rdc
Disk Usage Read Bytes Rdc
Disk Usage Reads Rdc
Disk Usage Service Time Rdc
Disk Usage Write Bytes Rdc
Disk Usage Writes Rdc
File System Usage Disk Queue R
File System Usage Disk Read By
File System Usage Disk Reads R
File System Usage Disk Service
File System Usage Disk Write B
File System Usage Disk Writes
File System Usage Files Rdc
File System Usage Free Rdc
File System Usage Percent
File System Usage Total Rdc
File System Usage Used Rdc
Free DiskSpace RDC
Free Memory RDC
Mem Actual Free Rdc
Mem Actual Used Rdc
Mem Free Percent Rdc
Mem Ram Rdc
Mem Total Rdc
Mem Used Percent Rdc
Mem Used Rdc
Net Stat All Inbound Total Rdc
Net Stat All Outbound Total Rd
Net Stat Tcp Inbound Total Rdc
Net Stat Tcp Outbound Total Rd
Proc Stat Idle Rdc
Proc Stat Running Rdc
Proc Stat Sleeping Rdc
Proc Stat Stopped Rdc
Proc Stat Threads Rdc
Proc Stat Total Rdc
Proc Stat Zombie Rdc
Resource Limit Core Cur Rdc
Resource Limit Core Max Rdc
Resource Limit Open Files Cur
Resource Limit Open Files Max
Swap Free Rdc
Swap Page In Rdc
Swap Page Out Rdc
Swap Total Rdc
Swap Used Rdc
Tcp Active Opens Rdc
Tcp Attempt Fails Rdc
Tcp Curr Estab Rdc
Tcp Estab Resets Rdc
Tcp In Errs Rdc Tcp In Segs Rdc
Tcp Out Rsts Rdc
Tcp Out Segs Rdc
Tcp Passive Opens Rdc
Tcp Retrans Segs Rdc
Thread Cpu Sys Rdc
Thread Cpu Total Rdc
Thread Cpu User Rdc
Used CPU By Process
Used Memory By Process RDC
whereas a pilot using a Linux version/distro may select some or all of the Linux KPIs or some or all of the KPIs defined for the specific version/distro being employed such as
  CPU
  Cpu Idle Ssh
  Cpu Info List Cache Size Ssh
  Cpu Info List Cores Per Socket
  Cpu Info List Length Ssh
  Cpu Info List Mhz Ssh
  Cpu Info List Total Cores Ssh
  Cpu Info List Total Sockets Ss
  Cpu Irq Ssh
  Cpu Nice Ssh
  Cpu Perc Combined Ssh
  Cpu Perc Idle Ssh
  Cpu Perc Irq Ssh
  Cpu Perc Nice Ssh
  Cpu Perc Soft Irq Ssh
  Cpu Perc Stolen Ssh
  Cpu Perc Sys Ssh
  Cpu Perc Wait Ssh
  Cpu Soft Irq Ssh
  Cpu Stolen Ssh
  Cpu Sys Ssh
  Cpu Total Ssh
  Cpu User Ssh
  Cpu Wait Ssh
  Disk Usage Queue Ssh
  Disk Usage Read Bytes Ssh
  Disk Usage Reads Ssh
  Disk Usage Service Time Ssh
  Disk Usage Write Bytes Ssh
  Disk Usage Writes Ssh
  File System Usage Disk Queue S
  File System Usage Disk Read By
  File System Usage Disk Reads S
  File System Usage Disk Service
  File System Usage Disk Write B
  File System Usage Disk Writes
  File System Usage Files Ssh
  File System Usage Free Ssh
  File System Usage Percent
  File System Usage Total Ssh
  File System Usage Used Ssh
  Free Disk Space
  Free Memory
  Mem Actual Free Ssh
  Mem Actual Used Ssh
  Mem Free Percent Ssh
  Mem Ram Ssh
  Mem Total Ssh
  Mem Used Percent Ssh
  Mem Used Ssh
  Net Stat All Inbound Total Ssh
  Net Stat All Outbound Total Ss
  Net Stat Tcp Inbound Total Ssh
  Net Stat Tcp Outbound Total Ss
  Proc Stat Idle Ssh
  Proc Stat Running Ssh
  Proc Stat Sleeping Ssh
  Proc Stat Stopped Ssh
  Proc Stat Threads Ssh
  Proc Stat Total Ssh
  Proc Stat Zombie Ssh
  Resource Limit Core Cur Ssh
  Resource Limit Core Max Ssh
  Resource Limit Open Files Cur
  Resource Limit Open Files Max
  Swap Free Ssh
  Swap Page In Ssh
  Swap Page Out Ssh
  Swap Total Ssh
  Swap Used Ssh
  Tcp Active Opens Ssh
  Tcp Attempt Fails Ssh
  Tcp Curr Estab Ssh
  Tcp Estab Resets Ssh
  Tcp In Errs Ssh
  Tcp In Segs Ssh
  Tcp Out Rsts Ssh
  Tcp Out Segs Ssh
  Tcp Passive Opens Ssh
  Tcp Retrans Segs Ssh
  Thread Cpu Sys Ssh
  Thread Cpu Total Ssh
  Thread Cpu User Ssh
  Used Cpu By Process
  Used Memory By Process
and/or
(b) API kpi's—if the pilot uses an API—such as
  API URL Response Time
  API Base URL Response Size
  API Base URL Response Time
  API Query Length KPI
  API Total Time KPI
  API URL Response Time
(c) database KPIs—if the pilot uses a database—such as (this is only a small portion of all possible database KPIs)
  DB Inserts
  DB Number Of Processes
  DB Reads
  DB Response Time
  DB Selects
  DB Total Memory Used
  DB Kilobytes Received
  DB Kilobytes Sent
  DB Created Temporary Disk Tables
  DB Created Temporary Files
  DB Created Temporary Tables
  DB Opened Table Definitions
  DB Opened Tables
  DB Opened Files
  DB Statements Executed
  DB Key Reads
  DB Key Writes
  DB Table Locks Immediate
  DB Table Locks Waited
  DB Threads Cached
  DB Threads Connected
  DB Threads Created
  DB Threads Running
  DB Up Time
  DB Transactions that use disk
  DB Transactions that use cache DB Joins that perform table scans
DB Joins that check for key usage
DB Joins that perform full scan
DB Slow Queries
DB Max Used Connections
DB Free Memory in Query Cache
DB Queries Registered in Query Cache
DB Deleted Queries from Cache
DB Opened Connections
DB Aborted Connections
DB Aborted Clients
DB Thread Cache Size
DB Slow Launch Threads
DB Sort Scan
DB Sort Rows
DB Select Scan
DB Select Full Join
DB Select Range Check The above KPIs allow to predict not only technical KPIs but also business ones such as:
  Startup system resources over- or under-utilization
  Startup system availability
  Startup system reliability
  Startup system possible downtimes
  Business continuity (startup system disaster recovery)
  Startup system fault tolerance
  Startup system latency
  Startup system quality of service
  Risk of business flow/task failure
  Percentage of business processes where completion falls within +/−5% of the estimated completion
  Average business process overdue time
  Percentage of overdue business processes
  Average business process age
  Percentage of business processes where the actual number of assigned resources is less than planned number of assigned resources
  Sum of costs of "killed"/stopped active business processes
  Average time to complete business flow/task
  Sum of deviation of time (e.g. in hours or days) against planned schedule of all active business processes
  Total business flow/task duration
  Risk of data loss 2. Generate test environment for each pilot, to be used by all start-ups taking part in this specific pilot, which is normally associated with a single enterprise. Any suitable method described herein, for generating a test environment for each pilot, to be used by all start-ups taking part in this specific pilot, may be employed.

3a. Aggregate KPI data—collect KPIs
(both x- and y-KPIs for neural net model generation and training, and x-KPIs only for neural net model validation and verification)
from each start-up installed in hence operating within the text environment generated in operation 2, typically periodically e.g. each 5-15 minutes. This may be implemented as agentless remote KPI discovery, or by agent-based local KPI discovery, or in both of these modes, which may be user-selectable or system-selectable.

3b. Send aggregated data to central data aggregator for storage in any suitable computerized data format.

4. Prepare sets of training data and sets of test data: Each set of training data may include, say, 48 hours worth of KPIs for a specific pilot and start-up; whereas each set of test data may include, say, 24 hours worth of KPIs for the same pilot and startup. Typically, each pilot/startup's training data set includes thousands of records, each including—say—two pki-x values and the corresponding measured pki-y value, all measured typically, at the same given time.

Of course, training data and test data typically does not overlap; typically the test data is that which immediately follows the training data so if the training data represents the KPIs generated from Sunday 3 pm till 3 pm, the test data might represent measured y-KPI value/s generated from Tuesday 3 pm till Wednesday 3 pm. Typically, sets of training data and sets of test data are generated for each pilot and each startup operating within that pilot and for specific KPIs defined for that pilot. Typically, an engine activates a suitable s/w functionality in Apache Flink and Hadoop, to perform this operation, typically periodically e.g. once every 5 minutes. Typically, each file including training data includes records, each including a set of x-KPIs and the corresponding set of y-KPIs as measured. Each file includes test data which may include thousands or tens of thousands of records, each including a set of x-KPIs. It is appreciated that many files, such as 20 files, may be generated each period (e.g. every 5 minutes). Thus, the sets of training data and sets of test data may be regarded as moving windows whose width is, say, a day or more, and wherein the distance between moving window positions is, say, a few minutes or an hour.

Eventually, two files (one training set and one test set) may be generated for each set of KPIs, for each pilot, and for each start-up operating within the pilot. The s/w functionality e g Flink may process input data pertaining to dozens or more of KPIs, of which are generated one file pertaining, say, to kpi-x1, kpi-x2, kpi-y1 (for a pilot which is interested in kpi-x1, kpi-x2 as independent variables and in kpi-y1 for its dependent variable; then another file pertaining, say, to kpi-x3, kpi-x4, kpi-y2, etc. For a pilot which is interested in kpi-x3, kpi-x4 as independent variables and in kpi-y2 for its dependent variable, where kpi-y1, kpi-y2 here refers to the measured values of the kpi in question as opposed to values of the kpi in question which are estimated from x-kpi values. For simplicity, it is assumed that pilots are restricted to only two kpi-x's and only one kpi-y however this is in no way limiting; any suitable number of measurable and derivable kpi's may be employed such as, say, 10 each. The s/w functionality e.g. Flink may override, each time it generates a new training set or test set, the previously generated training set or test set (for the same pilot, startup, and kpi set).

Typically, the current training set and test set are each stored in distributed fault-tolerant storage, in association with the relevant pilot id, startup id and id of the relevant KPIs e.g. Kpi-x3, kpi-x48, kpi-y40 if the training set includes the 3rd and 48th kpi's in the "pool" of kpi-x's, and the 40th kpi in the "pool" of kpi-y's.

5. A suitable set of neural network definition parameters is determined, which defines desired properties of the neural network to be generated in operation 6 below. Any suitable machine learning engine e.g. H20 may be employed for this and the following parameters:

| | |
|---|---|
| distribution<br>enum | Distribution function |
| tweedie_power<br>double | Tweedie Power |
| balance_classes<br>boolean | Balance training data class counts via over/under-sampling (for imbalanced data). |
| class_sampling_factors<br>float [ ] | Desired over/under-sampling ratios per class (in lexicographic order). If not specified, sampling factors will be automatically computed to obtain class balance during training. Requires balance_classes. |
| max_after_balance_size<br>float | Maximum relative size of the training data after balancing class counts (can be less than 1.0). Requires balance_classes. |
| max_confusion_matrix_size<br>int | Maximum size (# classes) for confusion matrices to be printed in the Logs |
| max_hit_ratio_k<br>int | Max. number (top K) of predictions to use for hit ratio computation (for multi-class only, 0 to disable) |
| overwrite_with_best_model<br>boolean | If enabled, override the final model with the best model found during training |
| autoencoder<br>boolean | Auto-Encoder |
| use_all_factor_levels<br>boolean | Use all factor levels of categorical variables. Otherwise, the first factor level is omitted (without loss of accuracy). Useful for variable importances and auto-enabled for autoencoder. |
| activation<br>enum | Activation function |
| hidden<br>int [ ] | Hidden layer sizes (e.g. 100, 100). |
| epochs<br>double | How many times the dataset may be iterated (streamed), can be fractional |
| train_samples_per_iteration<br>long | Number of training samples (globally) per MapReduce iteration. Special values are 0: one epoch, −1: all available data (e.g., replicated training data), −2: automatic |
| target_ratio_comm_to_comp<br>double | Target ratio of communication overhead to computation. Only for multi-node operation and train_samples_per_iteration = −2 (auto-tuning) |
| seed<br>long | Seed for random numbers (affects sampling)- Note: only reproducible when running single threaded |
| adaptive_rate<br>boolean | Adaptive learning rate |
| rho<br>double | Adaptive learning rate time decay factor (similarity to prior updates) |
| epsilon<br>double | Adaptive learning rate smoothing factor (to avoid divisions by zero and allow progress) |
| rate<br>double | Learning rate (higher => less stable, lower => slower convergence) |
| rate_annealing<br>double | Learning rate annealing: rate/(1 + rate_annealing * samples) |
| rate_decay<br>double | Learning rate decay factor between layers (N-th layer: rate * alpha^(N − 1)) |
| momentum_start<br>double | Initial momentum at the beginning of training (try 0.5) |
| momentum_ramp<br>double | Number of training samples for which momentum increases |
| momentum_stable<br>double | Final momentum after the ramp is over (try 0.99) |
| nesterov_accelerated_gradient<br>boolean | Use Nesterov (recommended) accelerated gradient |
| input_dropout_ratio<br>double | Input layer dropout ratio (can improve generalization, try 0.1 or 0.2) |
| hidden_dropout_ratios<br>double [ ] | Hidden layer dropout ratios (can improve generalization), specify one value per hidden layer, defaults to 0.5 |
| l1<br>double | L1 regularization (can add stability and improve generalization, causes many weights to become 0) |
| l2<br>double | L2 regularization can add stability and improve generalization, causes many weights to be small |
| max_w2<br>float | Constraint for squared sum of incoming weights per unit (e.g. for Rectifier) |
| initial_weight_distribution<br>enum | Initial Weight Distribution |
| initial_weight_scale<br>double | Uniform: −value . . . value, Normal: stddev) |

-continued

| | |
|---|---|
| loss<br>enum | Loss function |
| score_interval<br>double | Shortest time interval (in secs) between model scoring |
| score_training_samples<br>long | Number of training set samples for scoring (0 for all) |
| score_validation_samples<br>long | Number of validation set samples for scoring (0 for all) |
| score_duty_cycle<br>double | Maximum duty cycle fraction for scoring (lower: more training, higher: more scoring). |
| classification_stop<br>double | Stopping criterion for classification error fraction on training data (−1 to disable) |
| regression_stop<br>double | Stopping criterion for regression error (MSE) on training data (−1 to disable) |
| quiet_mode<br>boolean | Enable quiet mode for less output to standard output |
| score_validation_sampling<br>enum | Method used to sample validation dataset for scoring |
| diagnostics<br>boolean | Enable diagnostics for hidden layers |
| variable_importances<br>boolean | Compute variable importances for input features (Gedeon method) - can be slow for large networks |
| fast_mode<br>boolean | Enable fast mode (minor approximation in back-propagation) |
| force_load_balance<br>boolean | Force extra load balancing to increase training speed for small datasets (to keep all cores busy) |
| replicate_training_data<br>boolean | Replicate the entire training dataset onto every node for faster training on small datasets |
| single_node_mode<br>boolean | Run on a single node for fine-tuning of model parameters |
| shuffle_training_data<br>boolean | Enable shuffling of training data (e.g. if training data is replicated and train_samples_per_iteration is close to #nodes x #rows, of if using balance_classes) |
| missing_values_handling<br>enum | Handling of missing values. Either Skip or MeanImputation. |
| sparse<br>boolean | Sparse data handling (Deprecated). |
| col_major<br>boolean | Use a column major weight matrix for input layer. Can speed up forward propagation, but might slow down backpropagation (Deprecated). |
| average_activation<br>double | Average activation for sparse auto-encoder (Experimental) |
| sparsity_beta<br>double | Sparsity regularization (Experimental) |
| max_categorical_features<br>int | Max. number of categorical features, enforced via hashing (Experimental) |
| reproducible<br>boolean | Force reproducibility on small data (may be slow - only uses 1 thread) |
| export_weights_and_biases<br>boolean | Whether to export Neural Network weights and biases to H2O Frames |
| model_id<br>Key | Destination id for this model; auto-generated if not specified |
| training_frame<br>Key | Training frame |
| validation_frame<br>Key | Validation frame |
| nfolds<br>int | Number of folds for N-fold cross-validation |
| keep_cross_validation_predictions<br>boolean | Keep cross-validation model predictions |
| response_column<br>VecSpecifier | Response column |
| weights_column<br>VecSpecifier | Column with observation weights |
| offset_column<br>VecSpecifier | Offset column |
| fold_column<br>VecSpecifier | Column with cross-validation fold index assignment per observation |
| fold_assignment<br>enum | Cross-validation fold assignment scheme, if fold_column is not specified |
| ignored_columns<br>string [ ] | Ignored columns |
| ignore_const_cols<br>boolean | Ignore constant columns |

| | |
|---|---|
| score_each_iteration boolean | Whether to score during each iteration of model training |
| checkpoint Key | Model checkpoint to resume training with |

Neural network definition parameters may include properties of the process used to generate the neural network e.g. The number of iterations of machine learning which are "permitted". According to one embodiment, a single generic set of neural network definition parameters is defined, for all startups participating in a specific pilot, or even for all pilots. However, this is not intended to be limiting.

6. A suitable machine learning engine is employed to generate a neural network, which fits e.g. best fits the current training set stored in operation 4 above. The neural network may be generated e.g. in source code (say in Java) or alternatively access via some API (say REST) provided by the used machine learning engine in the operation 6. This operation 6 may be activated periodically e.g. once per hour. Typically, neural network definition parameters are determined once and are used repeatedly by the machine learning engine, once per hour, each time in combination with a new set of training and test data (in view of the newest position of the moving windows for training data and for test data. According to certain embodiments, the neural network generated each period (e.g. each hour) is tested e.g. on the test data and overrides the neural network generated previously either unconditionally or, alternatively—only if the newer neural network predicts more accurately than the previous neural network (say 90% prediction accuracy of pki-y as a function of pki-x's, for the newer network, vs. 70% for the previous neural network).

7. If the machine learning engine fails to generate a neural network (e.g. Due to noisy variables relative to the amount of data collected and/or due to insufficient correlation between the x and y variables, or due to insufficient computational resources (memory and/or processor of the machine learning engine), a suitable error message is generated which may for example recommend that more data be collected; for example, if the moving data window is 48 hours in width, perhaps a 72 hour wide window may be used. Failure may be determined, for example, if a neural network generated from a particular training set fails to predict the data in the test set, using a predetermined definition of failure. In the event of failure, any suitable measure may be implemented e.g. running another iteration of machine learning or enlarging the width of the moving window. The test set may have a fixed size or may have a dynamic size in which case a larger test set may be used in the event of failure.

8. If the machine learning engine succeeds in generating a neural network, the neural network is stored and is used to provide, typically in real-time, kpi-y data computed from user-provided kpi-x data, to a "simulator" which allows an enterprise cto end-user, associated with a pilot, to manipulate the pilot's kpi-x values and to be presented, responsively, typically in real-time, with the predicted kpi-y value. Typically, the neural network code generated in operation 7 is run each time a user of the simulator slides one or both pki-x values to a new position.

Any suitable user input option may be provided to allow the enterprise cto end-user to select values for the pilot's kpi-x parameters e.g. A sliding scale for each kpi-x appearing on the workstation screen. Then kpi-x values may be selected by sliding a cursor (say) back and forth along the scale. This is particularly useful as a decision support tool. For example, an enterprise CTO end-user may know that the startup software has certain peak memory requirements. Therefore, the enterprise CTO end-user may be trying to decide whether to select startup a or startup b. To facilitate this decision making process, the two kpi-x values selected may be CPU Total Ssh and Disk Usage Writes Ssh and the kpi-y value selected may be Mem Free Percent Ssh. Then, if Mem Free Percent Ssh is low the enterprise cto end-user may decide to prefer startup a, whereas if Mem Free Percent Ssh is high, the enterprise cto end-user may decide to prefer startup b.

9. Enterprise cto end-user selects one startup and integrates that startup's software with the enterprise's software.

According to certain embodiments, a computerized system is provided, for serving a first population of start-up end-users and a second population of enterprise end-users including generating a neural network for at least one startup and at least one enterprise's pilot and using the neural network to predict at least one derivable KPI from measurable KPIs generated by that startup within that enterprise's pilot.

According to certain embodiments, a computerized method for quantifying performance of start-ups within pilots is provided, including at least some of the following operations:

For each pilot, define specific measurable KPIs;

Generate test environment for each pilot, to be used by all start-ups taking part in this specific pilot;

Aggregate KPI data and send aggregated data to central data aggregator;

Prepare sets of training data and sets of test data;

Define suitable set of neural network definition parameters;

Use machine learning engine to generate, typically periodically, a neural network which fits the current training set stored above;

If the machine learning engine succeeds in generating a neural network, the neural network is stored and is used to provide data to a "simulator" which allows an enterprise CTO end-user, associated with a pilot, to manipulate the pilot's kpi-x values e.g. on a screen, and to be presented, responsively, typically in real time, with the predicted kpi-y value.

Any suitable subset of, or all of, the KPIs listed in the context of the neural network-based implementation for prediction analytics described above, may be employed as prediction KPIs when implementing any of the embodiments described herein.

Security aspects of the system, some or all of which may be provided, are now described in detail.

To achieve security of shared data, the process of access may be secured on some or all of several levels. First, the platform typically uses the "man in the middle" approach to decrypt and analyze traffic over pilots' secured channels, such as, say, SSH/SSL incoming traffic, as described in detail below.

Using best-of-breed Application Firewall OSS, the platform typically covers the majority of the best known threats, fighting with them via technologies like AppSensor and Snort.

Moreover, the platform typically analyzes the incoming traffic for pilot-based threats, like corrupting the shared memory or interrupting other pilot processes, attempts at reverse engineering, etc. This kind of security check is actual in POC mode whereas in the majority of other circumstances, the breaches caught by this mode are not serious threats. Data security procedures mentioned herein are not intended to be limiting and additional procedures may of course be added as suitable.

Pre-Approve Practice

When the data in the POC environment is sensitive, a pre-approve feature may be used. In this mode, start-ups cannot access the partner platform until the partner CTO approves the access (approval may, if desired, include the signing, via the platform, of various digital NDA/legal forms, or personal communication with the CTO or any desired due diligence).

Security Locks on the Data Reading

The engine aka server is capable of exposing only certain parts of the enterprise data (only the filtered fragment in both Big Data and RDBMS segments).

Automated Anonymizing of the Data, Fake Data

Most of the enterprises give fake, outdated or anonymized data for POC. The engine aka server contains various automation tools for anonymizing the data with automatic replacement of patterns.

A secured access channel—which may, if desired, even be Read-Only Secured Access (ROSA) may be provided. For example, the following methods and/or actions may be employed:

Secure SSL with SSL striping for API access: Each REST request for partner API may be decrypted and checked for vulnerabilities using AppSensor, which defines a conceptual framework and methodology that offers prescriptive guidance to implement intrusion detection and automated response, e.g. as described here: https://www.owasp.org/index.php/ApplicationLayerIntrustionDetection into applications.

Any suitable "man in the middle" approach for SSH channel Security and Analysis for Cloud, Data and Source Control access may be employed. For example, according to certain embodiments, to control and analyze the traffic. The server typically decrypts the incoming traffic using a "man in the middle" approach. Using (say) Ganymed technology, the server typically runs a SSHD proxy server that decrypts the traffic and forwards the decrypted traffic to the partner cloud. The "second" channel to the partner cloud is invisible to the end customer and is launched from the platform. All traffic events are audited and analyzed to build a behavioral analytics model. All traffic is analyzed using Bayesian statics and KPIs are analyzed and snap-shotted to make a behavioral analytics models.

Additionally, the server may have the capability to detect and mitigate pilot-related security issues, such as shared memory corruptions, bad code and malware, data stealing attempts, and other vulnerabilities.

Figure 10:
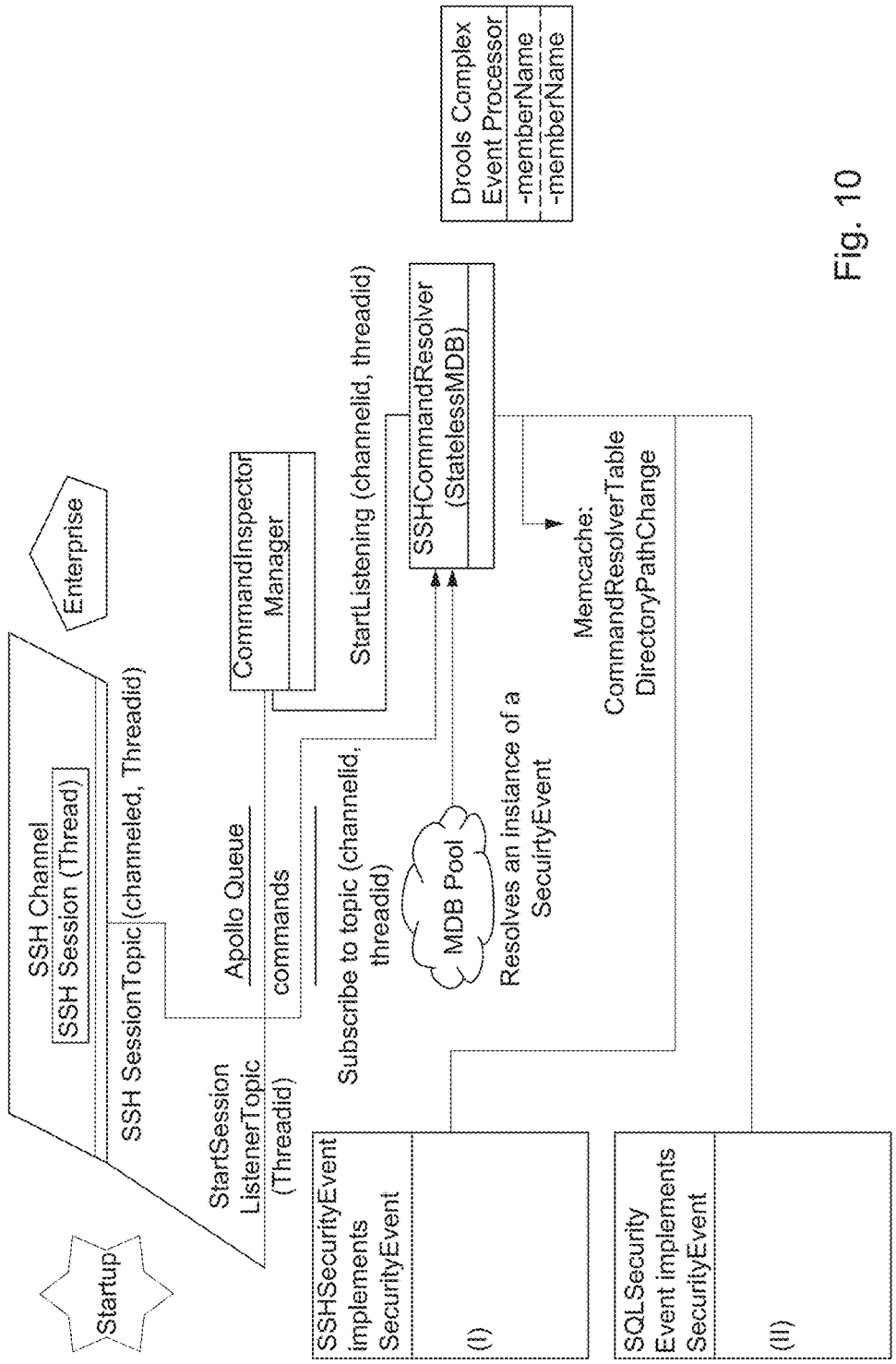

An example architecture for safeguarding pilot security, is illustrated in FIG. 10.

Block (I) (SSHSecurityEvent implements SecurityEvent) may for example include any or all of: int startup ID; int channelAnd SessionID; Timestamp commandFireTime// may be received in the message from the session; String original CommandLine; String cleanCommandLine; //based on the cleanCommandLie, Commandinspector tries to resolve the following information: String shellCommand//if null assume not yet known; String anyFlags; String resourcePath//if null assume not yet known; Boolean is Write//if false, it's a read operation, if true, it's a write operation; if null—not yet known. Block (II) (SQLSecurity Event implements SecurityEvent) may for example include any or all of: Timestamp; commandFireTime// may be received in the message from the session; String originalSQLCommand; StringaffectedDatabase; StringaffectedTable; BooleanisCreate; Boolean isRead; Boolean isUpdate; and Boolean isDelete.

Design principles for providing pilot security may include some or all of those now described.

Startups login to enterprise POC/Staging servers in order to set up their proof of concept. More than one startup may and likely may login to the same enterprise server. The server is typically operative to detect malicious startups behaviors e.g.:
  1. Against other startups
  2. Trying to spy on startups or enterprises
  3. Trying to damage the enterprise The goal is to determine malicious behavior on a timely basis and react in an appropriate way according to each scenario by warning the actor and/or ultimately, closing the channel. Pilot security functionality may, for example, record which server resources belong to which (currently running) pilot, and may then detect and mark as malevolent or potentially malevolent, events in which a first pilot tries to access a resource previously allocated to, or deemed to belong to or be associated with, a second pilot.

Pilot security does not cover standard security threats, which may be covered by SNORT.

Pilots may be designed analogously to roommates sharing a flat: they share certain facilities but as long as all have good intentions the pilot "room-mates" get along. Pilot Security is typically provided to detect malicious attacks and/or find out whether one of the pilot "room-mates" has malicious intentions.

Discovering motive: Comparing start-ups to standard behavior of benevolent startups may be used to detect malevolent startup operations. For example:

Installing Software Packages

This startup may use ops like wget to download tarballs/packages to install, or something like apt-get, untar and unzip, etc. The startup may then simply execute the files inside.

Installing System Utilities

E.g., svn, vim, or similar. This affects the public domain as different startups might seek to install different versions of the same tools.

Upgrading System Utilities

There might be some conflict there since another startup may be using a previous version of the utility.

Importing Source Code

This startup may use svn/git or just copy source code to the host machine; again this should not affect anyone else.

Configuration

A startup might need to configure common files of things such as app servers.

Using Chroot

Using chroot is a positive action—since chroot isolates the startup's operations in their own personal environment. The platform typically might want to reward Good Boys, not just slap bad ones.

Pilot security limitations may characterize the system, e.g. some or all of:

The platform typically does not log what each user did: each pilot user typically gets a user and uses a suitable software tool e.g. sudo which logs what each user did, and the enterprise can then review their operations It is typically not necessary for the system to catch malicious deletion of system files ("terrorism") since software tools like SNORT are capable of this; the same applies to catching viruses or malicious scripts.

What pilot security does do may include some or all of the following, to ensure each pilot stays out of the data of other pilots on the same machine in the same session:

If two startups try to view/edit the same file during a pilot session, the platform typically warns the parties involved If two startups try to view/edit the same database or db table during a pilot session, the platform typically warns the parties involved If a startup uses the name, password or db name of another startup, that startup is deemed to be sniffing in the other startup's business and thus the platform typically responds by warning or shutting down. It is appreciated that any outcome described herein is merely by way of example and alternatively, any other suitable outcome may be employed, here and elsewhere.

If a startup runs platform-disapproved commands (e.g. stopword commands), the platform typically warns or shuts that startup down.

Possible Pilot Hacking Scenarios may include some or all of the following:

1. One startup views the same file another startup is editing while both channels are running (common resource, race condition)

Commands: cat, vi, vim, gedit, xedit ( . . . all other editors)+the file name

The platform typically needs to know the current path of each user. If the file is accessed using full path, then the platform typically knows the path and watches if any of the other startups are currently accessing that path; if more than one startup accesses the same path, the platform typically may warn all of them that a common path is being used. How to implement: table tracking current accessed resources and who is accessing them; discover if conflict exists & warn the other party.

If The file is accessed by a series of cd commands, then the platform typically determines where user is located or based. The platform typically may have a separate channel open which runs cd && pwd commands to follow the user down the directory tree and see which files they are editing or viewing 2. One startup edits the same file as another startup (e.g. Commands: cat, vi, vim, gedit, xedit ( . . . all other editors)+the file name . . . then w!, q!, etc.).

If a startup only views a common file, they may be warned; if they also then send a w! command after being warned, the platform typically shuts down their pilot 3. A startup tries to sniff which other startups are on this machine by looking at database names, other files, etc.

4. Two startups edit/modify a common file. If user uses full path

The system may check if that path is a SYSTEM PATH or the USER'S OWN PATH. If user removes an isolated directory (no full path or partial path) then optionally, the system is configured to find out from the syslog what is happening; and/or to issue warning and (alert human?)

5. One startup running grep or find with another startup's stopword such as grep and the name of the other startup. In such a case, the system may shut down the pilot 6. Ps operation that views the running processes with the grep of a stopword; a sophisticated spy may just run ps and copy the output and then search for the output locally from his own computer 7. Ps operation that views the running processes with the grep of a stopword 8. Cd operation with a stopword in the path The platform typically warns the startup not to sniff around 9. Ls operation with a stopword in the path The platform typically warns the startup not to sniff around 10. Copying a war/ear file to deploy in a common app server with another startup's stopword Cp.war/.ear to a common app server folder 11. Stopping (killing) an already running service or process used by someone else (not started by me)

e.g. service catalina stop sigkill, sighup, sigterm a process that was not started by me (the session holder)

12. Running an SQL query with the stopword of another startup

Such as the other startup's database name or database table name. for this the system typically ensures that the db names and proprietary table names used by each startup are known ahead of time.

13. Running a REST query with the stopword of another startup

14. Real time data gathering

Real time data may be gathered through the data channel (SQL/DB commands), SSH channel, REST API and docker (ssh).

The data may be published to a message queue and then consumed by the Security Engine.

15. Messaging technology may employ Apache Kafka or Amazon Kinesis or Apache Apollo, or any other suitable technology.

16. Timely Detection may be provided as per some or all of the following embodiments a-e (SSH channel detection, data channel detection including stopping word scanning, state based data channel detection, API channel detection, Docker channel detection. Embodiment a. SSH Channel detection—The SSHCommandConsumer may be reading each command a startup makes through their channel. The following are example strategies to implement detection.

Strategy 1—SharedResourcesMap

Key value pairs

---

Class StartupAndIsEditing {
String startupName
Boolean isEditing /// trying to figure out whether this resource is just being
viewed or also edited by this startup
}
Class Startup{
String startupName
In startupUID
}

---

Map<FilePathString,StartupAndIsEditing> sharedResourcesMap

Key: path of a resource being edited or viewed

Value: name of the first user, guess on whether the resource is being edited (true if yes) Resources are determined as used as a 'first come, first served' in the same session (for two startups operating at the same time). Thus, if a file is opened by startup1 and then viewed by startup2, the platform typically may warn startup2 that someone else is using that file.

Strategy 2—Command Parsing

Command parsing may attempt to see if the command contains within it any sensitive linux command on the list; the platform will typically also determine whether the command contains a path and the platform typically may try to determine if this is a shared resource.

String cmd///the command that came from the server

From this, the platform typically may to determine whether any sensitive linux commands exist here by miming cmd.contains(sensitiveCommand)

Resulting in:

Set<String> sensitiveLinuxCommands///any Linux commands contained within the command string that are deemed to have a degree of sensitivity Set<String> stopWordsFound Set<String> anySharedPaths SecurityAgent may have reference maps (or persisted DB tables) that may help the agent make an action decision based on suitable rules such as some or all of on the following:

Map<StopWord,Severity> severityOfStopwords

Severity determines the decision—either DoNothing, Warn or ShutDown

Strategy 3—Stop Word Determination

This functionality may collect as many sensitive words about a startup without having to ask them manually e.g. all or any subset of:

The name of another startup currently running a pilot on the same machine

The db name used only by another startups

A linux username used only by another channel

A password used only by another channel

A directory path that only should be accessed by another startup—such as the home dir of a different startup or their source code(svn/git) clone location Strategy 4—Determining a List of Stop Words (Suspicious Words) Ahead of Time, Per Startup, Per Pilot as Well as Enterprise The system may associate with each startup, enterprise and pilot a list of words that, if used by the startup running the pilot, would be considered suspicious and require a response (e.g. alerting an appropriate party, stopping the pilot, etc.).

How this list of words may be determined: Any or all of the following solutions may be employed, separately or in any suitable combination:

"Proprietary" words of other startups/enterprises in the same pilot

These are typically not the pilot stopwords, but the startup's private words, used later for the pilot's stopwords. Upon pilot registration by a startup, the system may automatically determine for that startup or enterprise, a list of stop words that would be used only by the startup or enterprise (the Uniqueness Principle, see below). These include passwords, usernames, technology names, database names, and then allow the startup user to manually edit/modify this secret list; (Advanced: add a Response Classification to each word in terms of severity: (e.g. 0-3: warn the startup; 4-7 warn suspected violator and platform; 8-10: immediate shutdown of the pilot). In order for such a word to be qualified to enter such a list, it may be first determined that this kind of word is likely to only be used by that one particular pilot. This might include:

Proprietary software/product names (e.g. Startup A has developed a POC software named XYZ; it makes no sense that startup B would use the word XYZ in its commands Passwords Force strong access passwords to avoid two startups using same passwords;

when setting a password, disallow passwords already used

User interface may prompt startup to add such keywords manually for their protection Uniqueness Principle: a startup's proprietary words may belong to it and to it only within the set of startups under check This can either be in the Global Scope (one keyword per startup) or on the per-pilot scope—one keyword per startup among the startups within the current pilot Possible Uniqueness Principle downfall: conflict with two or more startups/enterprise using the same sensitive words If the above occurs, manual intervention may create an abstract "security victim group" that represents a sensitive word for multiple organizations and listing them together. (e.g. if the stop word is 'unlocker', the platform typically may associate that stop word with a "victim" that is common to all enterprises.

Issues with using passwords as stop words: 1. password overlap; 2. Encrypted passwords Password overlap can be solved by forcing a strong password on users upon registration and also by checking whether such a password already exists; Encrypted passwords: determine if the server can use the encrypted version and 'catch' occurrences of such.

Another stop-word issue: If a stop word arrives in chunks in the stream, the platform typically needs to address this in the scanning phase.

Determining the pilot's final list of stop-words

The pilot's final list of stop-words may be determined based on the proprietary words of the other startups accessing that same pilot (possibility: within the entire system/platform described herein). In other words, those whom a pilot is being shared with, are those which are suspect. If the system is to determine sniffing, such as a situation in which one startup tries to determine whether another startup is within the pilot, it may be desired to expand the set of proprietary words to all startups participating in the system, rather than dividing by startups.

Global Stop-Words dictionary

The platform typically may decide strategically that the best way to go about pilot security is to compare each query against a global stop-words dictionary, excluding the startup's own stop-words. This may provide for very good security.

The global dictionary of "blacklisted" stop-words would comprise key-value pairs in which the value may comprise of which startup, enterprise, or "Virtual Victim" the word relates to (there can be only one, to conform with the Uniqueness Principle), and the severity level, which may determine the response; this value set can possibly be expanded at a future stage.

Global Stop-Words dictionary downside: risk of false alarm

A downside might be Error Words—words that are erroneously stop-words and can create an issue by wrongly alerting the system; a solution for this would be to monitor real world stop word trigger occurrences and adjust the stop word dictionary accordingly in case of a "false alarm".

Possible performance improvement: global "white word" dictionary

It may be beneficial to have an indexed dictionary of white-words that is self-learning—white words that pass the test get added to the dictionary, and each word is first run against the whitelist. This may be not beneficial on the other hand, since the whitelist dataset may invariably be larger than the blacklist dataset.

Improvement on white world dictionary: whitelisted whole commands

Commands that pass the checks may be hashed and then future commands may be tested against the whitelist. Possible fault: a whitelisted command becomes "malicious" after some time because the list of "stop words" has increased. Possible solution: occasional update scans of whitelist entries against the blacklist dataset diff (blacklisted words that had been added since each whitelist entry).

Possible performance improvement: global "white word" dictionary.

Embodiment b: Data Channel Detection—Stop Word Scanning

Data channel SQL statements arriving at the data pipe are not well formatted and the platform typically wants to avoid having to parse them. For this reason the platform typically may first scan them for stop words such as the names of the other startups in the pilot+any other sensitive names if those are provided as extra by the other startups in the pilot.

Embodiment c: Data Channel Detection—State Based

The system may attempt to detect which databases and tables each user is trying to access by parsing the incoming SQL's and inputting into a resource map similar to the file path map in the SSH channel, and then warn a startup if they are trying to access the same resource, and another startup is accessing in the same session.

Problem: parsing the SQL may be difficult because of the nature of the SQL's through the data channel coming through in an unstructured format.

Embodiment d: API Channel Detection

The system may scan the keys&values coming through the requests trying to detect stopwords Embodiment e: Docker Channel Detection Same as SSH Channel detection 17. Command Scanning architecture & Speed Optimization—this may be characterized by any or all of the following aspects:
    Minimizing the waiting time of each individual "Atomic Scan"

Each command (i.e. User Request) may go through a Pilot Security Scan. Speed optimization of an Atomic Scan may be provided, e.g. as described herein—making its running time as small as possible using indexing, hashing, dictionaries, etc. speed optimization of the entire system may be desirable, with the goal of scanning a command that came into the queue as soon as possible—so that the response might also be as fast as possible. Pilot Security may be thought of as similar to Airport Security. Each command is a passenger and the platform typically wants that command to go through security as soon as possible. For this, the platform typically may not have just one security check but many; the "customers" (commands) may be in queue and may be examined by multiple Examiners (subscribers/workers/security clearance agents). In airports there are also optimizations for flight departures—i.e. some passengers in the queue get whisked to the top of the line if their plane departs soon (in the case of this application, it might be if the last command examined from the same user has taken place a while ago, and the platform typically must look at the previous one, or if the command frequency from one user floods the system with an influx of rapid commands)

Possible threat: huge command influx from one pilot

In case of a flooding of commands, the platform typically might also detect that and create a DDoS suspicion notification.

Avoiding bottleneck scenarios:

The platform typically wants to minimize the Waiting Time of each individual command and also minimize the size of the queue; so the system may strive to increase the number of Processors/Security Scanners according to the size of the queue; and if the queue becomes too large, the system may check whether one pilot is blocking that queue and the platform typically might remove all the nodes therefrom and either stop the pilot, or transfer them to a separate queue/warn a concerned party about possible overflooding. This mechanism may be termed the Waiting Time Optimizer. Ideally, the platform typically wants to make sure any command that is executed receives proper inspection within one second (say) of being sent.

Waiting time monitoring formula:

The platform typically employs a monitoring formula that calculates the average customers in the system and the average waiting time (Little's Law), and adjusts the number of inspectors accordingly.

Possible issue with the asynchronous architecture: it disallows temporal pattern detection (drools style):

It may be sufficient for Pilot Security to merely scan for stop words asynchronously.

18. Individual Inspection (Atomic Scan) Architecture may include some or all of the following operations, suitably ordered e.g. as follows:

Operation 1—clean up the command of garbage (optional)

Trim, remove beep and other irrelevant characters

Operation 2—hash the command and compare against the Whitelisted Index The platform will typically use Lucene to keep a hashed index of whitelisted commands; if the command passes the platform typically, no action needs to be performed.

Operation 3—if the command does not pass whitelist, map-reduce the keywords in the command for individual keyword scanning.

The platform typically takes the command string and map-reduces the words in the command string; then the platform typically scans each individual words against the blacklist (excluding the startup's own Proprietary Keywords+those of the Enterprise). If the command passes, the platform typically adds the command to the Whitelist Hash; if the command fails, the platform typically check the severity of the stopwords and which other Startups/Enterprises it affects, and sends the command through to the Security Agent for inspection.

19. Proper Response:

Typically, a Security Agent functionality is provided which is operative for determining the Proper Response for cases that do not pass the security check. These may comprise any suitable response, such as but not limited to any or all of: clearing suspect of suspicion if this was a false alarm, alerting a concerned party (platform/enterprise/another startup at risk from the "offending" startup); shutting down the pilot of the "offending" startup.

Distributed scalable architecture may be employed. SecurityAgents and the Kafka Queue is typically operative to run on separate machines allowing for pilot security that is scalable based on the number of running channels. Architecture may include some or all of:

1. The platform typically identifies each startup's Private Words & a list of sensitive linux commands the platform typically wants to match mapped to severity level: stopword->severity
2. The platform typically assigns a stopword map to each startup & pilot session (the startup's stopwords are the Private Words of the other startups in the session+the predefined suspicious linux commands
3. Sending commands via topics from SSH into Kafka
   a. SecurityAgents subscribe to the topics being run within the same pilot & open a second (spy) connection. The platform typically has to ensure that each ssh channel has one topic and only one consumer using it. Also, the platform typically may construct the architecture in such a way that each SecurityAgent will be in charge of what is connected to the same machine, so that they can share information about that machine and the shared resources being accessed on it.
4. The SecurityAgents always run the commands in the same sequence on which they had been run by the user.
5. In case of cd command, the platform typically determines (e.g. runs pwd to discover) location of user, so the platform typically can find out resource paths being used.
6. The platform typically keep an in-memory (e.g. persisted) map of path->user pairs. If a path already exists and is taken up by another user, the platform typically warns the user trying to access it that someone else is currently in the path.
7. Then the platform typically runs stopword expressions on the command, to see if any stopwords are being used in the command.
8. If stopwords are found, the platform typically passes the command, along with its severity, and the path (if any) along with which other startup it has touched (if any, or null if none) to the SecretAgentDecider who decides whether to just warn the startup under suspicion or to shutdown their channel.

In PipeThread.StreamCopyThread:
Make sure Synchronizer started a SecurityAgent for the pilot
SecurityAgent is a JavaBean consumer of Kafka messages, it may be reading commands from the pilot's Kafka topic and checking their security
Make sure there is a Kafka topic for this particular session
SecurityAgent may be a consumer of all Kafka topics running at the same time per machine, so it can keep track of common resources
For each command (search for: StreamCopyThread run-data channel) Use a KafkaProducer to send commands to Kafka
   In Data Channel & API Channel:
Same as the SSH channel rules, except instead of shared file path the platform typically look for two startups reading and updating into the same DB's, tables, cells.

Pilot Security Architecture typically includes receiving commands in a scalable way, then understanding the commands, analyzing and applying security rules and responses to them. Some or all of the following components may be provided:

Apollo Queue:
Apollo Q (which resides on a separate server and can also be on a separate machine from the machines on which the channels are running), which receives messages from each open session. There may be one topic per open session (and channel), so that on the other side of the queue, the consumers may receive an ordered stream of the commands the user is entering.

Sending commands in a separate topic per session:
Background: Channels are managed by the Synchronizer application. Each channel has a channel ID and a port of its own, and belongs to one startup connecting to one enterprise. Startups then open new sessions on each channel. Each session is a Thread, which has a Thread ID. The platform typically combines the Channel UID with the thread UID to receive a unique SessionUID. Using this session UID, the platform typically may create a new Topic that starts when the session starts.

When an SSH session starts, the server typically may send a special message through the startSSHCommandInspector topic which may send the SessionUID and be received by the CommandInspectorManager on the other side, which may then start (or assign from a pool, depending on the management scheme selected), a new Message Driven Bean called SSHCommandInspector that may subscribe to the topic of that particular session (the topic may be named the SessionUID. Likewise, when the session gets closed, it may send a kill signal through the Queue to CommandInspectorManager to kill the session.

SSHCommandResolver, SQLCommandResolver:
There may be two command inspector types: SSHCommandInspector for SSH sessions and SQLCommandInspector for Database sessions. The platform typically may also create special subclasses for the various types of Databases as they may require different parsing for the various technologies.

Command Resolver:
The command resolver's job may include cleanup and parse each command, and resolve as much information from the command. Information of interest typically includes determining which resource the command affect, whether it is a read, write or execute operation, what is the command and possibly what were the other flags of the command.
CommandResolver is a stateless message bean, however it may use the memcache in order to store change directory commands until a real security event can be resolved (a view/execution/deletion)
CommandResolver's ultimate goal is to come up with a Security Event which comprises the following information:

Class SSHSecurityEvent implements SecurityEvent { // in the case of an SSH event
    int startupID
    int channelAndSessionID
    Timestamp commandFireTime // the platform typically receives this in the message from the session
    String originalCommandLine
    String cleanCommandLine
    // based on the cleanCommandLine, CommandInspector tries to resolve the following information:
    String shellCommand // if null, the platform typically does not know (yet)
    String anyFlags
    String resourcePath // if null the platform typically does not know (yet)
    Boolean isWrite // if false, it is a read operation, if true, it is a write operation; if null the platform typically does not know (yet)
    Boolean isExecute // may be an execute operation;
    Boolean isDelete
}

-continued

```
Class SQLSecurityEvent implements SecurityEvent {
    Timestamp commandFireTime // the platform typically receives this
    in the message from the session
    String orignalSQLCommand
    String affectedDatabase
    String affectedTable
    boolean isCreate
    boolean isRead
    boolean isUpdate
    boolean isDelete
}
```

Sending SecurityEvents to drools:
The CommandInspector may then send the SecurityEvents to a Drools fusion temporal Complex Event Processor. The rules may be set up in such a way as to catch operations of two startups which are, for example, e.g. using or accessing one another's resources.

Kafka-based architecture may be employed e.g. as shown in FIG. 7. Apache Kafka is an open-source message broker project developed by the Apache Software Foundation.

Linux Keywords may each be assigned a suspiciousness level e.g.:
0 ok
1 suspicious-do nothing
2 suspicious-check resources being used
3 very suspicious-warn
4 hand caught in the cookiejar—terminate session An example method for generating a platform constructed and operative in accordance with certain embodiments may include some or all of the following operations, suitably ordered e.g. as follows:

Provide Pilot Security Functionality:
1. Identify the startup propriety items from the details startup enters (e.g. processes, files, directories, tables)
2. Using standard commands identify in real-time which resources the startup is using
3. Write Purser which understands each of these standard commands
4. Identify security violation (overlap in actions in the same time or startup which uses other startup's proprietary items)
5. Implement SNORT security system to identify malicious security threats
6. Create the relevant action based on the violation policy table (e.g. alert enterprise, stop channel, pause pilot)

Figure 8:
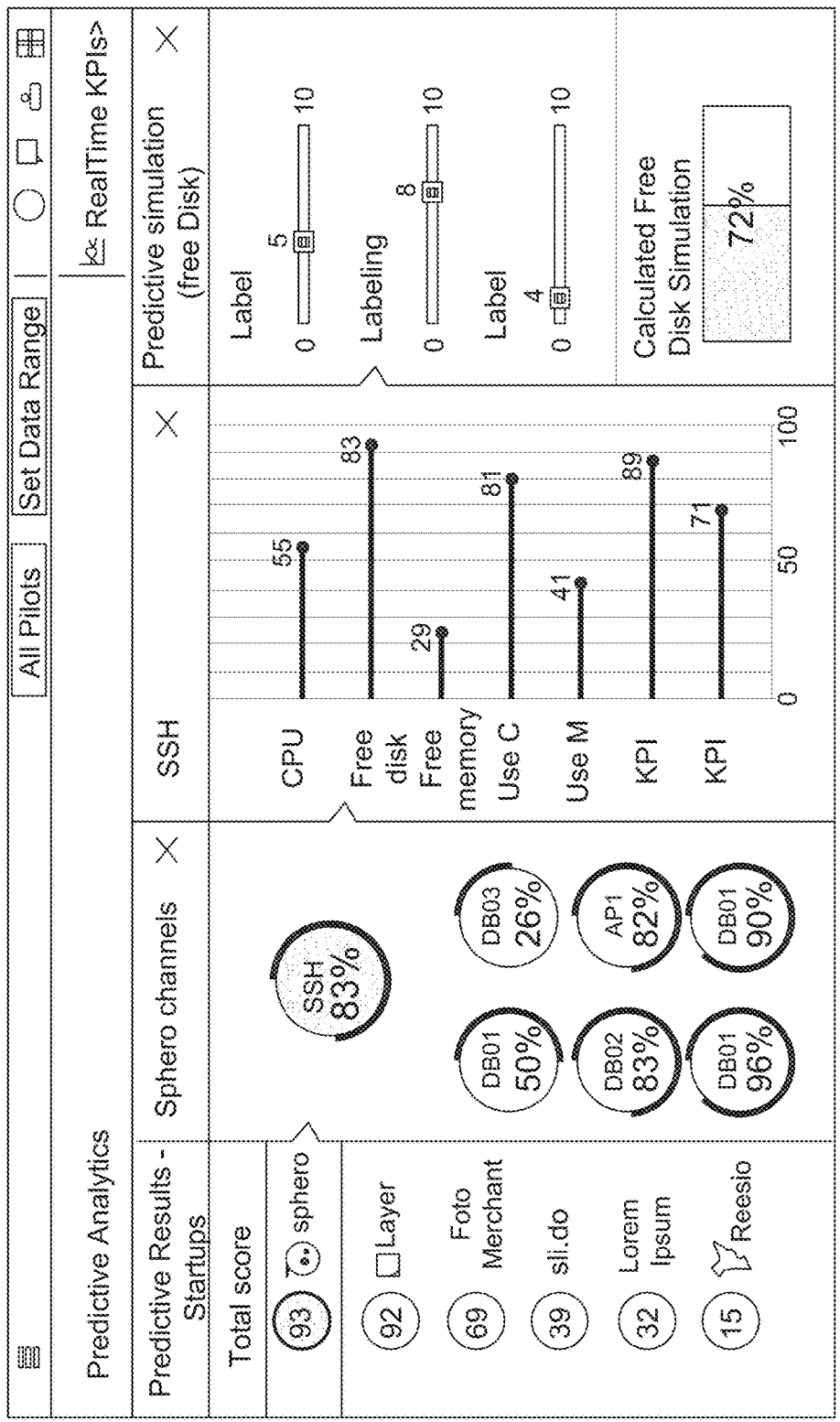
FIGS. 8, 9 are example simplified screenshots wherein aspects of either or both of these may be generated by the user interface shown and described herein.

Provide Analytics Prediction Functionality:
1. Connect to channel and measure KPIs
2. Save the KPIs in Jason format on Hadoop
3. Using Apache Flink create 2 data files (each include 3 columns—dependent KPI and 2 independent KPIs/parameters):
   a. KPI measurement per discrete marginal time (e.g. last hour)
   b. KPI measurement per larger date range (e.g. last 24 hours)
4. Optionally, run suitable process for detecting KPI changes—perhaps for example run ANOVA (Analysis of Variance) using Apache server on the marginal file
5. If a statistically significant change is identified in operation 4 above, take the larger file and use neural networks as described herein (or, H2O system to get updated regression equation for this KPI)
6. Calculate for this KPI the prediction grade
7. Repeat this process for all pilots, startups, KPIs and channels
8. Present these results in the relevant dashboard screens—e.g. as shown in the example of FIG. 8.

Figure 9:
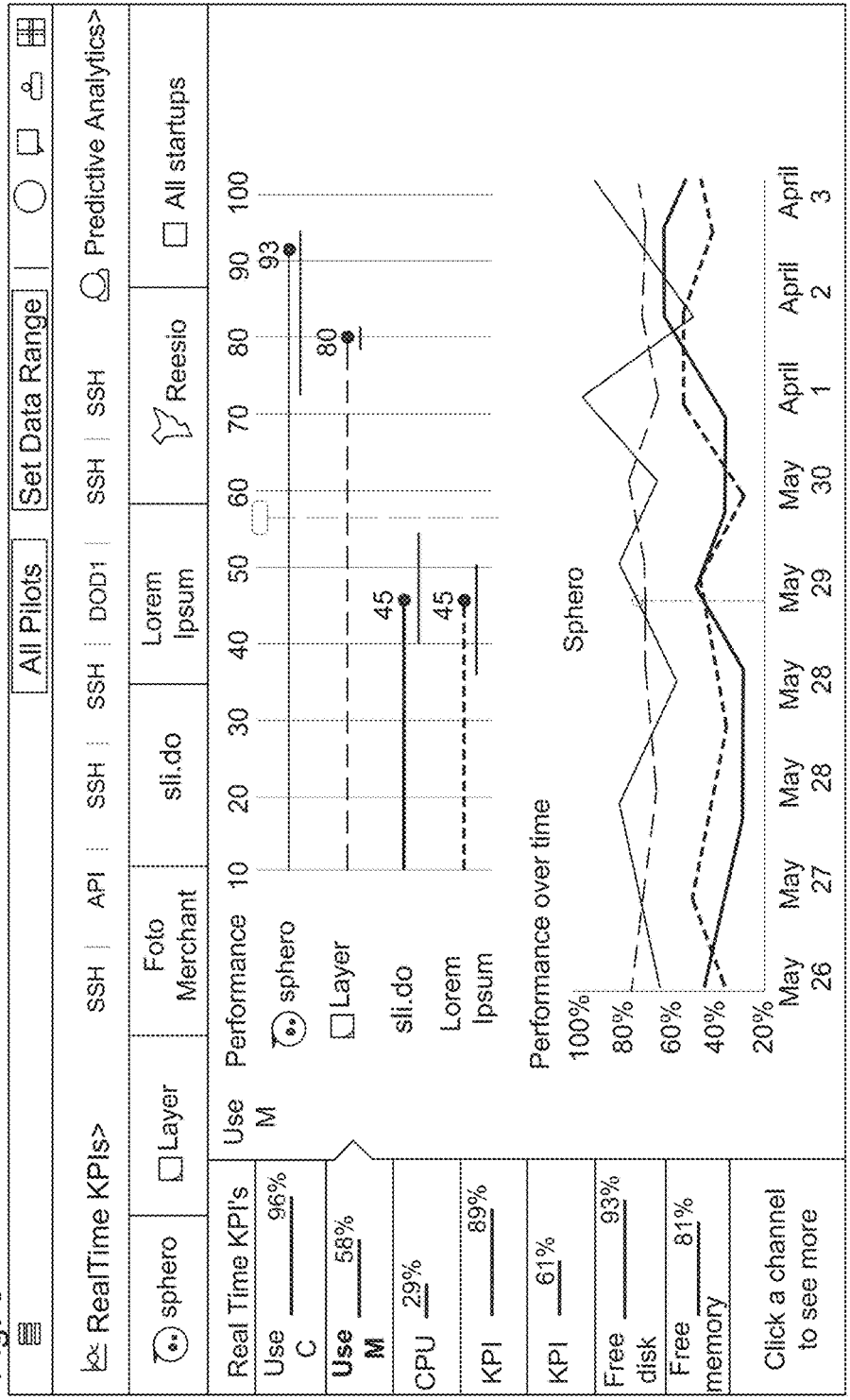

Provide Pilot Real-Time KPIs Functionality:
1. For each channel write classes which check and capture different KPI (pre-define list) using standard interfaces (e.g. give KPI value)
2. run relevant commands (e.g. in Linux DF)
3. upon receipt of an answer, run purser to extract the specific KPI which has been captured (e.g. CPU usage)
4. send the KPI data to Flume server in Hadoop using REST API
5. write it as Jason
6. enable $3^{rd}$ party/enterprise custom KPIs using API
7. Repeat this process for all pilots, startups, KPIs and channels
8. Present these results in the relevant dashboard screens e.g. as shown in the example of FIG. 9.

Provide Platform Integrating the Above:
1. Generate "marketplace" platform where startups, enterprises and VCc can search discover and engage in PoCs or pilots:
   a. develop search and discovery tools (search boxes, search results, sorting, refine search)
   b. develop registration processes (internal or Using LinkedIn API)
   c. Develop suitable match scores and algorithms e.g. as described herein
   d. develop rating mechanism
   e. Incorporate internal and external payment mechanism (e.g. Stripe using API)
   f. pilot creation Wizard for enterprise
   g. Develop startup join pilot wizard
   h. Develop Auto-discovery mechanism which automatically discover pilot environment components
   i. For all of the above develop GUI screens (see examples below) as well as backend capabilities (tables, algorithms, processes etc.) in SaaS environment, e.g. as described above.

Any suitable user interface may be provided for the platform, including all or any subset of the following functionalities:

a. An end-user e.g. start-up may browse for pilots by category. Responsively, the end-user may be informed, say, that 4 enterprises are running 14 pilots in the category the startup has defined (say by keying in the word "security").

b. An end-user may select a pilot, and responsively, may see data regarding that pilot such as but not limited to all or any subset of: the pilot's duration and geographical location, whether or not joining the pilot requires enterprise's manual approval, whether a particular start-up is eligible for the pilot if the pilot has pre-defined acceptance criteria and/or the acceptance criteria themselves, what API/server/operating system the pilot uses and how same is/are configured, information regarding start-ups already associated with the pilot.

c. An end-user may select a category and responsively, view a list of enterprises active in the category in question e.g. all enterprises or all those except enterprise/s which have requested anonymization/privacy.

d. An end-user can request to view all pilots (or all pilots satisfying a given criterion e.g. a particular category) that the end-user e.g. start up or enterprise is currently associated with. Responsively, the end-user is shown how many pilots are associated with that end user and for each, a pilot status indication e.g. one or more of: defined, active, paused, completed (=predefined duration is in the past), require attention because of technology issues. For each pilot, the end-user may see graphs of KPIs as they vary over the duration of the pilot e.g. % of free disk, of free memory, of CPU employed by the pilot, etc. These graphs may be superimposed to facilitate comparison between pilots.

e. An end-user e.g. enterprise may create a new pilot e.g. enter a name, duration, category; select and configure operating system; define VPN type (if a virtual private network—VPN—is employed), indicate whether privacy/data anonymization is required (yes/no or level thereof), criteria for accepting startup (e.g. open to all, requires manual approval of enterprise which created the pilot, automated approval based on startup criteria pre-defined by pilot-creating enterprise), number of startups allowed to participate in pilot (can be defined as "unlimited"). pilot-creating enterprise can also select and configure channels (aka links, tunnels) to link a port on an end-user's local machine to a port on a remote host e.g. cloud hosting the platform shown and described herein, thereby to establish communication between end users' local machine/s and the remote host. For example, the enterprise may select one of: DBs, API, SSH, RDS (Relational Database Services). If the pilot-creating enterprise selects, say, DBs, the pilot-creating enterprise may then be prompted to fill in particulars for that selection e.g. all or any subset of: name, URL, user name, password, IP address, port number, type of database e.g. MySQL. The pilot-creating enterprise may also be prompted to upload a pilot document, typically in natural language e.g. English, and in any supported format such as MS-Word, PDF, for startup end-users to read. This pilot document is made available to start-up end-users which click on this pilot, once the pilot has been defined and made available to the start-up virtual community using the platform shown and described herein.

f. An end-user e.g. enterprise may stop or pause a pilot that the enterprise previously created.

Advantages of certain embodiments include up-ending the long, tedious, inefficient pilot process for tech start-ups by allowing enterprises to find and test outside innovation (and evaluate proof of concept) efficiently; rather than expending scarce R&D, system admin, security and other resources on the management of maybe a handful of tech pilots each year, the secure platform described herein is operative to manage the process including controlling and viewing pilots through an intuitive and efficient dashboard, such that CTOs can more easily initiate, manage and evaluate pilots hence can participate in a virtually unlimited number of pilots. After reviewing standardized analytics and KPIs, "cream of the crop" (the best/top-class) pilots may easily be selected by a human operator for further integration within an enterprise, potentially gaining valuable new tech at a fraction of the typical overhead used to run a much smaller number of pilots conventionally. Standardized (over pilots) analytics may be used to provide an objective, quantifiable proof of concept, facilitating pilot (and end-user) acquisition.

Efforts required from CTOs to work with the platform may become no more than the non-onerous efforts invested in other SaaS services. For example, cloudcheckr.com requires exactly the same prerequisites: creating and providing a read-only user credential. bigpanda.com gives, as a result, various credentials and SDKs that start-ups may work with. Start-ups gain a dramatically smoother path towards pilot and customer acquisition.

Certain embodiments significantly reduce the installation time needed for pilot implementation. After a one-time set-up at the enterprise, the server typically enables access to an unlimited number of start-ups.

The platform may provide security, automatization and/or serialization at all levels of access, mitigating risk related to the pilot pipeline.

Certain embodiments provide a KPI dashboard for all participants, aka end-users, who see objective analytic parameters of the pilot.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and may not be required or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones, may be operatively associated with, but be external to the cloud.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. An end-to-end "pilot as service" system for software pilot testing, serving a plurality of clients from among a first plurality of enterprise clients and individual start-up clients from among a second plurality of start-up clients, the system including a server and at least one processor, wherein the server comprises:
   a registration functionality for pre-registering:
      a plurality of enterprise clients from among the first plurality of enterprise clients, wherein each enterprise client is registered that it is open for pilots on a specific topic, and
      a plurality of individual start-up clients from among the second plurality of start-up clients, wherein each individual start-up client is able to discover and register to participate in a pilot for a selected one of the respective enterprise clients open for a pilot on a specific topic;
   a generation functionality for automatically generating one or more software testing environments having API's and data, wherein the API and data represent real enterprise production data and developed API's for each selected enterprise client to simultaneously serve each of the individual start-up clients registered to a particular enterprise client;
   a pilot security functionality to create secured connection pipes for each startup client to their respective software testing environments, to allow concurrent running of a plurality of proof-of-concept tests for a plurality of software products provided by the individual start-up clients for a specific topic, wherein the secured connection pipe prevents any first start-up client from among the second plurality of start-up clients from affecting a proof-of-concept test for any software product being tested, on behalf of any second start-up client from among the second plurality of start-up clients; and
   a dashboard functionality, on the processor, operative for presenting at least one result of at least one proof-of-concept test to each client which has pre-registered using said registration functionality.

2. A system according to claim 1 wherein said software environment resides on a cloud and said clients interact with the software environment via a remote connection.

3. A system according to claim 2 wherein at a cloud access level, each start-up client is granted access directly to the cloud instance.

4. A system according to claim 1 wherein said set of software environment/s includes only one software environment simultaneously serving plural clients.

5. A system according to claim 1 wherein the system is agentless and nothing need he installed at client premises and wherein integration time with clients is near zero.

6. A system according to claim 1 wherein the system is based on SaaS (software as a service) technology and provides access from at least one client to at least one layer of integration employed by said tests.

7. A system according to claim 6 wherein said at least one layer of integration comprises an API layer.

8. A system according to claim 7 wherein the API layer provides logging of access and various usage metrics.

9. A system according to claim 6 wherein said at least one layer of integration comprises a data layer.

10. A system according to claim 6 wherein the SaaS technology creates an Intelligence engine that automatically embeds at least one enterprise client's production cloud.

11. A system according to claim 6 wherein Integration with an Enterprise client, given a Private cloud environment, includes prompting an optional read-only access user to access the running cloud environment allowing the system to search on disk, run native OS utilities, and perform remote analysis to discover running application servers.

12. A system according to claim 6 wherein Integration with an Enterprise client, given an On-premises environment (VPN-based premises access), includes creating an optional read-only access user in the VPN environment, and providing an access IP.

13. A system according to claim 1 wherein the system comprises a wizard-based process of platform discovery and exposure including provision of secured access to at least one layer of integration.

14. A system according to claim 1 wherein a wizard-based process provides at least one client with a secured access channel to at least one Data/RDBMS/BigData source.

15. A system according to claim 1 wherein a wizard-based process provides at least one client with a secured access channel to Source control.

16. A system according to claim 1 wherein a wizard-based process provides at least one client with a secured access channel to the Cloud Instance/VPN server itself.

17. A system according to claim 1 wherein a wizard-based process provides at least one client with a secured access channel pipe and wherein said server functions as a proxy via the secured access channel to computer KPIs characterizing a proof-of-concept test, from among said plural proof-of-concept tests, associated with said channel.

18. A system according to claim 1 wherein the system provides serialization of the proof-of-concept process.

19. A system according to claim 1 and also comprising prediction analysis functionality, on the processor, operative to generate at least one prediction analysis result.

20. A system according to claim 1 wherein clients interact remotely with the environment via the secure connection pipes.

21. A system according to claim 20 wherein the secure connection employs Remote Desktop Protocol (RDP) as a network protocol for exchanging data over at least one IP network.

22. A system according to claim 20 wherein the secure connection pipes secures access to each enterprise client's data and servers.

23. A system according to claim 1 wherein the system is based on SaaS technology and provides access from at least one client to at least one layer of integration which may be needed for said tests.

24. A system according to claim 23 wherein said at least one layer of integration comprises a layer which provides at least one client with secured access to source code at said server.

25. A system according to claim 1 wherein the server discovers at least one enterprise running BigData and Application Servers and visually represents them to the end-user e.g. CTO.

26. A system according to claim 1 wherein at least one enterprise client uses the dashboard to define which of the enterprise's servers/services he wants to expose to at least one start-up client associated with the enterprise client and wherein, responsively, the Pilot Security functionality airs a security channel to only those servers/services.

27. A system according to claim 1 wherein at least one enterprise client uses the dashboard to define how deeply to expose at least one enterprise server/service to at least one start-up client associated with the enterprise client and wherein, responsively, the Pilot Security functionality airs a security channel defined to expose each server/service to the at least one start-up client, only as deeply as the enterprise client has defined.

28. A system according to claim 1 wherein each client, having pre-registered, gains immediate access to a secure client-server channel over which to run proof-of-concept testing for software product/s associated with the client.

29. A system according to claim 1 wherein the server comprises an SSH server and clients comprise SSH clients which interact with the environment via said secure connection pipe which comprises an SSH channel ensuring secure client-environment communication over a network assumed to be insecure.

30. A system according to claim 1 wherein security of data shared by said clients is provided at least by using a "man in the middle" approach to decrypt and analyze SSH/SSL incoming traffic.

31. A system according to claim 1 wherein security of data shared by said clients is provided at least by using at least one Application Firewall OSS.

32. A system according to claim 31 wherein said Application Firewall OSS employs AppSensor technology.

33. A system according to claim 31 wherein said Application Firewall OSS employs Snort technology.

34. A system according to claim 1 wherein security of data shared by said clients is provided at least by analyzing incoming traffic for at least one pilot-based threat.

35. A system according to claim 34 wherein said at least one pilot based threat includes at least one of:
corrupting shared memory;
interrupting other pilot processes; and
attempts at reverse engineering.

36. A system according to claim 1 wherein an optional Preapprove mode is provided and when the system is in this optional Preapprove mode, start-ups seeking to begin a session with the system, can only access their enterprise's platform when an end-user acting for the enterprise approves said access.

37. A system according to claim 1 wherein the server is operative for exposing only certain predefined portions of at least one enterprise's data.

38. A system according to claim 37 wherein said predefined portions include only the filtered fragment in both Big Data and RDBMS segments.

39. A system according to claim 1 wherein said Pilot Security functionality is operative to detect events in which a first pilot tries to access a resource previously allocated to a second pilot.

40. A method for testing software pilots, serving a plurality of clients from among a first plurality of enterprise clients and individual start-up clients from among a second plurality of start-up clients, the method comprising:

providing registration functionality operative for pre-registering:
- a plurality of enterprise clients from among the first plurality of enterprise clients, wherein each enterprise client is registered that it is open for pilots on a specific topic, and
- a plurality of individual start-up clients from among the second plurality of start-up clients, wherein each individual start-up client is able to discover and register to participate in a pilot for a selected one of the respective enterprise clients open for a pilot on a specific topic; and providing a generation functionality for automatically generating one or more software testing environments having API's and data, wherein the API and data represent real production data and developed API's for each selected enterprise client to simultaneously server each of the individual start-up clients registered to a particular enterprise client;

providing a pilot security functionality to create secured connection pipes for each startup client to their respective software testing environments, to allow concurrent running of a plurality of proof-of-concept tests for a plurality of software products provided by the individual start-up clients for a specific topic, wherein the secured connection pipe prevents any first start-up client from among the second plurality of start-up clients from affecting a proof-of-concept test for any software product being tested, on behalf of any second start-up client from among the second plurality of start-up clients; and providing a dashboard functionality, on the processor, operative for displaying at least one result of at least one proof-of-concept test to each client which has pre-registered using said registration functionality.

41. A computer program product, comprising a non-transitory tangible computer readable medium having computer readable program code embodied therein, said computer readable program code adapted to be executed to implement a method for testing software pilots, serving a plurality of clients from among a first plurality of enterprise clients and individual start-up clients from among a second plurality of start-up clients, the method comprising:

providing a server including at least one processor for:
  providing registration functionality, on the processor, operative for pre-registering:
  - a plurality of enterprise clients from among the first plurality of enterprise clients, wherein each enterprise client is registered that it is open for pilots on a specific topic; and
  - a plurality of individual start-up clients from among the second plurality of start-up clients, wherein each individual start-up client is able to discover and register to participate in a pilot for a selected one of the respective enterprise clients open for a pilot on a specific topic; and providing a generation functionality for automatically generating one or more software testing environments having API's and data, wherein the API and data represent real production data and developed API's for each selected enterprise client to simultaneously server each of the individual start-up clients registered to a particular enterprise client;

providing a pilot security functionality to create secured connection pipes for each startup client to their respective software testing environments, to allow concurrent running of a plurality of proof-of-concept tests for a plurality of software products provided by the individual start-up clients for a specific topic, wherein the secured connection pipe prevents any first start-up client from among the second plurality of start-up clients from affecting a proof-of-concept test for any software product being tested, on behalf of any second start-up client from among the second plurality of start-up clients; and providing a dashboard functionality, for displaying at least one result of at least one proof-of-concept test to each client which has pre-registered using said registration functionality.

\* \* \* \* \*